United States Patent [19]
Kletzl et al.

[11] Patent Number: 5,782,421
[45] Date of Patent: *Jul. 21, 1998

[54] RECORDING AND/OR REPRODUCING APPARATUS FOR OPERATION WITH MAGNETIC-TAPE CASSETTES OF DIFFERENT SIZES

[75] Inventors: Franz Kletzl, Vienna; Henricus Ruyten, Gumpoldskirchen, both of Austria

[73] Assignee: U.S. Philips Corporation, New York, N.Y.

[*] Notice: The term of this patent shall not extend beyond the expiration date of Pat. No. 5,642,246.

[21] Appl. No.: 558,991

[22] Filed: Nov. 16, 1995

[30] Foreign Application Priority Data

Nov. 22, 1994 [AT] Austria ................... 2159/94

[51] Int. Cl.[6] ............... G11B 15/32; G11B 23/04
[52] U.S. Cl. ............ 242/336; 242/340; 242/349; 360/94
[58] Field of Search ................. 242/336, 340, 242/349; 360/94, 96.3, 96.5

[56] References Cited

U.S. PATENT DOCUMENTS

| 4,729,046 | 3/1988 | Steipe et al. ............ 242/336 X |
| 5,642,246 | 6/1997 | Kletzl et al. ............ 360/94 |

FOREIGN PATENT DOCUMENTS

0342619A2  11/1989  European Pat. Off. .

*Primary Examiner*—John Q. Nguyen
*Attorney, Agent, or Firm*—Bernard Franzblau; Michael E. Marion

[57] ABSTRACT

A recording and/or reproducing apparatus (1) which accepts two different sizes of magnetic-tape cassettes (15, 16) each having two juxtaposed reels (21, 22, 23, 24) comprises four drive devices (25, 26, 27, 28) mounted stationarily in the apparatus and each comprising a reel spindle (31, 32, 39, 40) and a reel disc (33, 34, 41, 42). Both the reel spindles (31, 32, 39, 40) and the reel discs (33, 34, 41, 42) are axially movable and, when a magnetic-tape cassette (15, 16) is loaded into the apparatus (1) in its operating position, the reel spindles (39, 40, 31, 32) and the reel discs (41, 42, 33, 34) which are not adapted to enter into driving engagement with the inserted magnetic-tape cassette (15, 16) are moved into an area situated outside the area occupied by the inserted magnetic-tape cassette (15, 16).

2 Claims, 14 Drawing Sheets

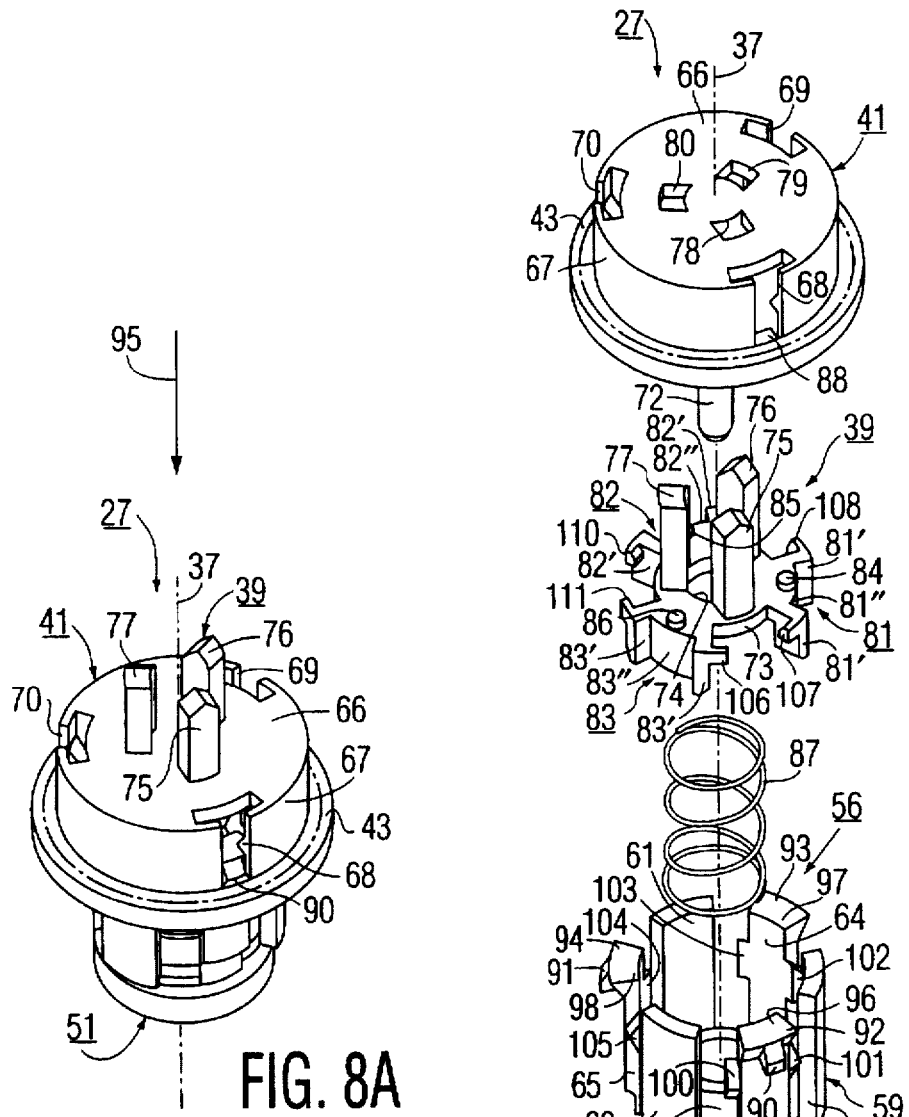

5,782,421

RECORDING AND/OR REPRODUCING APPARATUS FOR OPERATION WITH MAGNETIC-TAPE CASSETTES OF DIFFERENT SIZES

BACKGROUND OF THE INVENTION

1. Field of the Invention

The invention relates to a recording and/or reproducing apparatus into which either a magnetic-tape cassette having a given size and having at least one reel can be loaded in an operating position or into which a further magnetic-tape cassette having another size and having at least one further reel can be loaded in an operating position. For driving the reel of the one magnetic-tape cassette, a reel spindle is rotationally drivable relative to an axis, and, for supporting the reel of the one magnetic-tape cassette, a reel disc is provided which is coaxial with the axis. The reel spindle is movable in the direction of the axis between a driving position, in which it is in driving engagement with the reel of the one magnetic-tape cassette, and a non-driving position, in which it is situated outside the area occupied by the further magnetic-tape cassette in the operating position thereof. The reel disc is movable in the direction of the axis between a supporting position, in which it supports the reel of the one magnetic-tape cassette, and a non-supporting position, in which it is situated outside the area occupied by the further magnetic-tape cassette in the operating position thereof. For driving the further reel of the further magnetic-tape cassette, a further reel spindle is rotationally drivable relative to a further axis, and for supporting the further reel of the further magnetic-tape cassette, a further reel disc which is coaxial with the further axis.

2. Discussion of the Related Art

An apparatus of the type defined in the opening paragraph is known from, for example, EP-A-0,342,619. This known apparatus accepts either a magnetic-tape cassette of a given size, i.e. a smaller magnetic-tape cassette, in an operating position, or a further magnetic-tape cassette of another size, i.e. a larger magnetic-tape cassette, likewise in an operating position. Both the smaller magnetic-tape cassette and the larger magnetic-tape cassette each accommodate two juxtaposed reels, one reel being a supply reel and the other reel being a take-up reel. To drive the supply reels of both magnetic-tape cassettes there have been provided a single common reel spindle and a single common reel disc which is coaxial with this reel spindle, the reel disc being arranged at a fixed position in the apparatus and the reel spindle being only slightly movable in an axial direction relative to the reel disc to enable it to be moved in known manner by coupling portions of the hubs of the two supply reels when these coupling portions occupy a momentarily unfavourable position relative to the reel spindle when the magnetic-tape cassettes are inserted in their operating positions. To drive the take-up reel of a smaller magnetic-tape cassette there have been provided a reel spindle and a reel disc which is coaxial with this reel spindle, which reel spindle is axially movable between a driving position, in which it is in driving engagement with the take-up reel of the smaller magnetic-tape cassette, and a non-driving position, in which it is situated outside the area occupied by the larger magnetic-tape cassette in the operating position of this cassette, and which reel disc is axially movable between a supporting position, in which it supports the take-up reel of the smaller magnetic-tape cassette, and a non-supporting position, in which it is situated outside the area occupied by a larger magnetic-tape cassette in the operating position of this cassette, so that this reel spindle and this reel disc can be moved out of the area occupied by a larger magnetic-tape cassette in its operating position. To drive the take-up reel of a larger magnetic-tape cassette there have been provided a reel spindle and a reel disc which is coaxial with this reel spindle, the reel disc being arranged at a fixed position in the apparatus and the reel spindle being only slightly movable in an axial direction relative to the reel disc to enable it to be moved in known manner by coupling portions of the hubs of the supply reel of a larger magnetic-tape cassette when these coupling portions occupy a momentarily unfavourable position relative to the reel spindle when such a larger magnetic-tape cassette is inserted in its operating position. This construction of the reel spindles and the reel discs requires that the two magnetic-tape cassettes be adapted to one another as regards their construction, particularly as regards the position and construction of their supply reels, in order to enable these reels to be driven and supported by means of a single reel spindle which the same for both magnetic-tape cassettes and a single reel disc which is the same for both magnetic-tape cassettes, and that the smaller magnetic-tape cassette should be dimensioned so as to ensure that the area occupied by this cassette in its operating position in the apparatus is situated outside the area by the reel spindle and the reel disc for driving the take-up reel of a larger magnetic-tape cassette. These requirements impose restrictions, which are unfavourable and therefore undesirable.

SUMMARY OF THE INVENTION

It is an object of the invention to mitigate the above problems and to provide an apparatus which ensures that the reels of two magnetic-tape cassettes of different sizes are driven by simple and reliable drive means and which imposes hardly any restrictions as regards the construction of the two magnetic-tape cassettes of different sizes and as regards the construction and the position in the apparatus of the reel spindles and the reel discs and which requires no adaptation of the constructions of the two magnetic-tape cassettes of different sizes to one another. To this end the invention is characterised in that, in addition, the further reel spindle is movable in the direction of the further axis between a driving position, in which it is in driving engagement with the further reel of the further magnetic-tape cassette, and a non-driving position, in which it is situated outside the area occupied by the one magnetic-tape cassette in the operating position thereof, and that, in addition, the further reel disc is movable in the direction of the further axis between a supporting position, in which it supports the further reel of the further magnetic-tape cassette, and a non-supporting position, in which it is situated outside the area occupied by the one magnetic-tape cassette in the operating position thereof. Thus, it is achieved in a simple manner that the reel spindles and the reel discs for cooperation with the reels of both magnetic-tape cassettes can be arranged in an apparatus in accordance with the invention substantially without any restrictions as regards their construction and their arrangement in the apparatus, in conformity with the substantially independent construction of these magnetic-tape cassettes, and that not only when the further magnetic-tape cassette is inserted the reel spindle which is not suitable for driving a further reel in this further magnetic-tape cassette and the reel disc which is coaxial with said spindle can be moved out of the area of this further magnetic-tape cassette inserted into the apparatus, but also when the one magnetic-tape cassette is inserted the further reel spindle, which is not suitable for driving a reel in this one magnetic-tape cassette, and the further reel disc, which is coaxial with this spindle, can also be moved out of the area of this magnetic-tape cassette inserted into the apparatus.

In an apparatus in accordance with the invention, which comprises at least one supporting stop for the reel disc provided to support the reel of the one magnetic-tape cassette, which supporting stop is movable between a blocking position and a release position, by means of which supporting stop in the blocking position thereof the reel disc can be supported in its supporting position and can thereby be blocked against an axial movement towards its non-supporting position and which by its movement into its release position allows the reel disc to move into its non-supporting position, as is known per se from the afore-mentioned EP-A-0,342,619, it has proved to be advantageous if there has been provided, in addition, at least one further supporting stop for the further reel disc to support the further reel disc, which further supporting stop is movable between a blocking position and a release position, by means of which further supporting stop in the blocking position thereof the further reel disc can be supported in its supporting position and can thereby be blocked against an axial movement towards its non-supporting position and which by its movement into its release position allows the further reel disc to move into its non-supporting position. This enables a construction, which has already proved to be effective in the case of a reel disc for supporting a reel of one magnetic-tape cassette, to be used in addition for a further reel disc for supporting a further reel of a further magnetic-tape cassette.

As already stated, such an apparatus, which comprises at least one supporting stop for the reel disc provided to support the reel of the one magnetic-tape cassette, which supporting stop is movable between a blocking position and a release position, by means of which supporting stop in the blocking position thereof the reel disc can be supported in its supporting position and can thereby be blocked against an axial movement towards its non-supporting position and which by its movement into its release position allows the reel disc to move into its non-supporting position, is known from the afore-mentioned EP-A-0,342,619. This known apparatus has separate detection means formed by two microswitches mounted in a movable cassette holder, by means of which it is possible to detect whether a magnetic-tape cassette of a given size or a further magnetic-tape cassette of another size has been inserted into the known apparatus. This known apparatus further comprises a separate actuating device for moving two supporting stops for a reel disc, the actuating device including a motor and a toothed-wheel mechanism as well as a slide which is drivable by the toothed-wheel mechanism via a toothed rack the slide having two supporting stops formed by two raised portions which each change into a common ramp surface. When a magnetic-tape cassette is loaded into this known apparatus the size of the magnetic-tape cassette is detected by the detection means and, depending on the detection result, the actuating means move the supporting stops into the position corresponding to the inserted magnetic-tape cassette, i.e. either into the blocking position or into the release position. When the supporting stops are in their blocking position the reel disc is held in its supporting position opposed by the force of a spring which draws the reel disc towards the supporting stops, and when the supporting stops are in their release position the reel disc is held in its non-supporting position by the force of the tension spring. Thus, the tension spring and the actuating device as well as the supporting stops are needed for the actual displacement of the reel disc. The provision of separate detection means and of a separate motor-driven actuating device is rather complicated and is a disadvantage for a trouble-free, reliable, compact and cheap construction of the apparatus. Moreover, it is not unlikely that, for example owing to failure of the detection means, an erroneous detection occurs and, as a consequence, the reel disc is not moved into its non-supporting position although a further magnetic-tape cassette has been inserted into the known apparatus, which may result in damage to the reel disc and the reel spindle with which it is coaxial and to the inserted further magnetic-tape cassette. Such damage can be precluded by additional safety measures but this will make a known apparatus even more expensive.

In order to preclude the above problems a particularly advantageous embodiment of an apparatus in accordance with the invention is characterised in that between each reel spindle and each supporting stop for the reel disc which is coaxial with the relevant reel spindle means for moving the supporting stop are interposed, by which means during an axial movement of the reel spindle between its driving position and its non-driving position the supporting stop is movable from its blocking position into its release position, and that by insertion of a magnetic-tape cassette in the operating position thereof the reel spindle which is not adapted to drive a reel in said magnetic-tape cassette is movable into its non-driving position by cooperation with the housing of this magnetic-tape cassette and the relevant supporting stop is thereby movable into its release position with the aid of the means for moving the supporting stops and the relevant reel disc is movable into its non-supporting position by cooperation with the housing of this magnetic-tape cassette. Thus, it is achieved in a particularly simple manner that each reel spindle, which is present anyway and which is usually also axially movable relative to the reel disc with which it is coaxial in order to allow axial movement in the case of an unfavourable position of the reel spindle relative to the coupling portions during engagement with the coupling portions of the reel hub of a magnetic-tape cassette, is used as a detection means for the detection of a magnetic-tape cassette which is not adapted to enter into driving engagement with this reel spindle and during its movement from its driving position into its non-driving position moves the at least one supporting stop for the reel disc which is coaxial with this spindle from its blocking position into its release position and thereby enables the reel disc which is coaxial with this spindle to be moved into its non-supporting position, after which this reel disc can be moved into its non-supporting position with the aid of the magnetic-tape cassette which is not adapted to cooperate with said reel spindle and the coaxial reel disc under the influence of the mass of the cassette. In this way the desired result is obtained without separate detection means and without a separate motor-driven actuating device for a supporting stop for a reel disc, so that a particularly simple, reliable and compact construction is achieved.

An advantageous embodiment of an apparatus in accordance with the invention is characterised in that each reel disc is cap-shaped and has an upper cap wall and a hollow cylindrical circumferential cap wall connected the upper cap wall, in that the reel spindle which is coaxially connected to the caps-shaped reel disc is accommodated partly in the cap interior and has at least one reel spindle portion which projects from the cap interior through at least one opening in the upper cap wall, in that for supporting the reel disc and the reel spindle which is coaxially connected to this reel disc there has been provided an essentially pot-shaped bearing member which is rotatable about the axis and has a pot-bottom wall and a hub which is connected to the pot-bottom wall, for rotatably supporting the bearing member, and a substantially hollow cylindrical circumferential pot wall which is connected to the pot-bottom wall and extends into the cap interior of the reel disc, along which circumferential pot wall the reel disc is axially movable with its circumferential cap wall and which circumferential pot wall carries at least one supporting stop for the reel disc, that the pot interior of the bearing member accommodates a pressure spring which acts in an axial direction, which spring acts on the pot-bottom wall with one end and on the reel spindle with the other end, and in that for taking up the force of the pressure spring the reel disc comprises at least a first limiting stop and at least a second limiting stop adapted to cooperate with the first limiting stop. Such a construction is favourable because it is very simple, stable and compact. Moreover, such a construction is also very favourable for implementation by means of a plastics technology.

For a construction as described above it has also proved to be advantageous that the substantially hollow cylindrical circumferential pot wall of the bearing member comprises at least two first wall portions, which are rigidly connected to the pot-bottom wall and which are spaced at equal angles from one another, and at least two second wall portions, which are pivotally connected to the pot-bottom wall and which are spaced at equal angles from one another and angularly displaced relative to the first wall portions. This is advantageous for a simple mounting of the reel disc and of the bearing member during assembly and for a correct centring of the reel disc relative to the bearing member.

In this respect it has also proved to be advantageous if the at least one second limiting stop of the bearing member, which stop has been provided to take up the force of the pressure spring, is formed by a latching hook which projects radially from a second wall portion of the bearing member, which wall portion is pivotally connected to the pot-bottom wall, which latching hook projects into an opening in the circumferential cap wall of the reel disc. This results in a very simple construction and a very reliable connection of the reel disc and its bearing member.

In this respect it has further proved to be particularly advantageous if the at least one supporting stop for the reel disc is formed by a radial projection on a second wall portion which is pivotally connected to the pot-bottom wall, which projection is situated at the location of the free end of this second wall portion which is remote from the pot-bottom wall and, to cooperate with the projection the reel disc comprises an oppositely directed radial counter-projection, which bears upon this projection when the reel is correctly supported by the reel disc in the supporting position thereof. Such an embodiment is very simple and has the advantage that the reel disc is supported very reliably by the supporting stops.

It has also proved to be particularly advantageous that a control portion projects laterally in a circumferential direction from each second wall portion of the bearing member which is pivotally connected to the pot bottom wall, and that for each control portion the reel spindle comprises an actuating portion, each actuating portion and each control portion forming a part of the means for moving the at least one supporting stop, and the corresponding control portion and the second wall portion carrying the relevant control portion being movable in the opposite radial direction by means of each actuating portion when the reel spindle is axially moved into its non-driving position, so that the projection forming a supporting stop on each second wall portion of the bearing member is movable out of the range of movement of the counter-projection on the reel disc. Such an embodiment is of simple construction and has the advantage of a very simple and smooth actuation of the supporting stops.

Another advantageous embodiment of an apparatus in accordance with the invention is characterised in that each reel spindle and the reel disc which is coaxial therewith each form part of a drive means for a reel of a magnetic-tape cassette, in that at least one of these two parts of at least one drive means forms a positioning element for a magnetic-tape cassette which is not adapted to enter into driving engagement with these two parts, which supporting element, when the reel spindle is in its non-driving position and the reel disc is in its non-supporting position, supports the magnetic-tape cassette which is not adapted to enter into driving engagement with these two parts and which has been inserted in its operating position, and in that there is at least one positioning stop for the part of the drive means which forms a positioning element, by means of which positioning stop the part of the drive means which forms a positioning element the reel disc can be positioned in an axial direction when the reel spindle is in its non-driving position and the reel disc is in its non-supporting position. In this way the reel disc, or the reel spindle with which it is coaxial, or even both these parts are utilised in an apparatus in accordance with the invention for positioning a magnetic-tape cassette which is not adapted to enter into driving engagement with these parts in the axial direction of the reel disc and of the reel spindle after the reel spindle has been moved into its non-driving position and the reel disc has been moved into its non-supporting position.

In this respect it has also proved to be advantageous if at least one positioning stop for the part of the drive means which forms a positioning element is arranged on the hollow cylindrical circumferential pot wall of the bearing member. This is advantageous for a simple construction because the hollow cylindrical circumferential pot wall of the bearing member also carries the at least one positioning stop.

In this respect it has proved to be particularly advantageous if a positioning stop is formed by the free end of each first wall portion of the hollow cylindrical circumferential pot wall, which free end is remote from the pot-bottom wall, said first wall portion being rigidly connected to the pot-bottom wall. This results in a particularly simple construction of the positioning stops.

DESCRIPTION OF THE DRAWINGS

The invention will be described below with reference to two exemplary embodiments which are shown in the drawings but to which the invention is not limited.

FIG. 8 shows a drive means of the apparatus of FIG. 1. adapted to cooperate with a reel of a smaller magnetic-tape cassette. this drive means being shown in an assembled condition in part A of FIG. 8. in an exploded view in part B of FIG. 8. and in a plan view in part C of FIG. 8.

FIGS. 9, 10 and 11 show the drive means of FIG. 8 in an operating condition in which no magnetic-tape cassette has been loaded into the apparatus of FIG. 1.

DETAILED DESCRIPTION OF THE PREFERRED EMBODIMENTS

Figure 1:
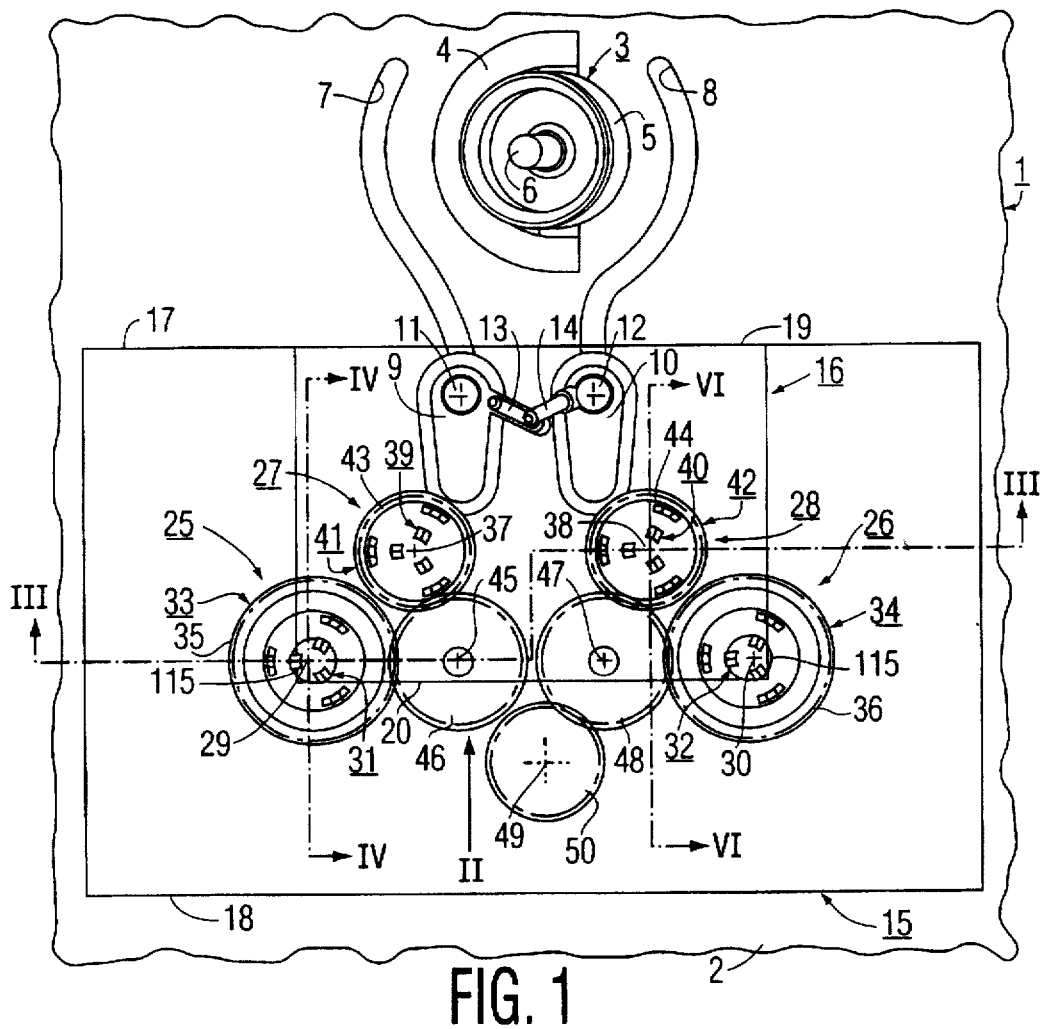
FIG. 1 is a diagrammatic plan view showing a part of a recording and reproducing apparatus in accordance with a first embodiment of the invention constructed as a video recorder, in which at option one of two magnetic-tape cassettes of different sizes, which each have two rotationally drivable reels for taking up a magnetic tape, can be inserted and which for driving the reels of the two magnetic-tape cassettes of different sizes comprises four drive means which each comprise an axially movable reel spindle and a likewise axially movable reel disc.

FIG. 1 shows diagrammatically the relevant part of a recording and reproducing apparatus in accordance with the invention. i.e. a video recorder 1. The video recorder 1 has a deck plate 2 on which a drum-shaped scanning device 3 is mounted by means of a separate mounting 4. The deck plate 2 has two slots 7 and 8. which each define a path of movement. Each of these two slots 7 and 8 guides the movement of a carriage 9 and 10. respectively. which are drivable in a manner not shown. Each of the two carriages 9 and 10 carries a rotatably supported tape guide roller 11 and 12. respectively. and a tape guide pin 13 and 14. respectively. FIG. 1 shows the two threading carriages 9 and 10 and the tape guide elements 11, 12, 13 and 14 carried by them in their so-called threaded-out position. From this threaded-out position the threading carriages 9 and 10 are movable along the slots 7 and 8 into their threaded-in position. in which a magnetic tape is wrapped around the drum-shaped scanning device 3 by means of the 11, 12, 13 and 14.

A first magnetic-tape cassette 15 of a given size can be loaded into the video recorder 1 in an operating position, as is shown diagrammatically in FIG. 1. Moreover, a further magnetic-tape cassette 16 of another size can also be loaded into the video recorder 1, as is also shown diagrammatically in FIG. 1. As can be seen. the first magnetic-tape cassette 1 is a larger magnetic-tape cassette and the further or second magnetic-tape cassette 16 is a smaller magnetic-tape cassette. In FIG. 1 the two magnetic-tape cassettes 15 and 16 are shown only diagrammatically by their outlines. For the detailed construction of these two magnetic-tape cassettes 15 and 16 reference can be made to, for example. EP-A2-0,548,852. which shows the detailed construction of these two magnetic-tape cassettes and which is herewith incorporated by reference.

To bring the two magnetic-tape cassettes 15 and 16 into their operating positions in the video recorder 1 this video recorder has a movable cassette holder, not shown in FIG. 1, which is movable between a loading position and an operating position along an L-shaped path of movement. into which cassette holder, when it is in its loading position. a cassette can be inserted and. when the cassette holder has been moved into its operating position. a cassette present in this holder occupies its operating position. Such a movable cassette holder is known in many variants, for which reason it is not shown herein. The video recorder 1 may alternatively have a differently constructed and differently movable cassette holder.

Moreover, it is to be noted that it is known from many variants to position magnetic-tape cassettes loaded into a video recorder in their operating positions, a correct tape transport in a video recorder 1 requiring not only lateral positioning but also vertical positioning. For the lateral and vertical positioning of the first and larger magnetic-tape cassette 15 the video recorder 1 comprises two positioning abutments, not shown in FIG. 1, which project from the deck plate 2 and which are disposed in the area of the front 17 of the larger magnetic-tape cassette 15 underneath the cassette. For the lateral and vertical positioning of the second and smaller magnetic-tape cassette 16 the video recorder 1 two positioning abutments, not shown in FIG. 1 have been provided, which project from the deck plate 2 and which are disposed in the area of the front 17 of the smaller magnetic-tape cassette 15 underneath the cassette. For vertical positioning the smaller magnetic-tape cassette 16 at the location of its rear 20 no separate positioning abutments have been provided but use is made of parts which also serve other purposes, as will be described in detail hereinafter.

Two juxtaposed reels 21 and 22 are rotatably supported in the larger magnetic-tape cassette 15 (see FIGS. 3 and 4), the reel 21 being usually referred to as the supply reel and the reel 22 as the take-up reel. A magnetic tape, not shown, can be wound between the two reels 21 and 22.

Likewise, two juxtaposed further reels 23 and 24 are rotatably supported in the smaller further or second magnetic-tape cassette 16 (see FIGS. 5 and 6), the further reel 23 being referred to as the supply reel and the further reel 24 as the take-up reel. A magnetic tape, not shown, also extends between the two further reels 23 and 24.

The further reels 23 and 24 have a different construction and another, i.e. smaller, diameter than the reels 21 and 22. This is not necessarily so, because a larger magnetic-tape cassette 15 may also comprise reels of the same diameter as the reels of a smaller magnetic-tape cassette if a larger magnetic-tape cassette with a smaller quantity of magnetic tape is required.

Figures 7A, 7B, 7C:
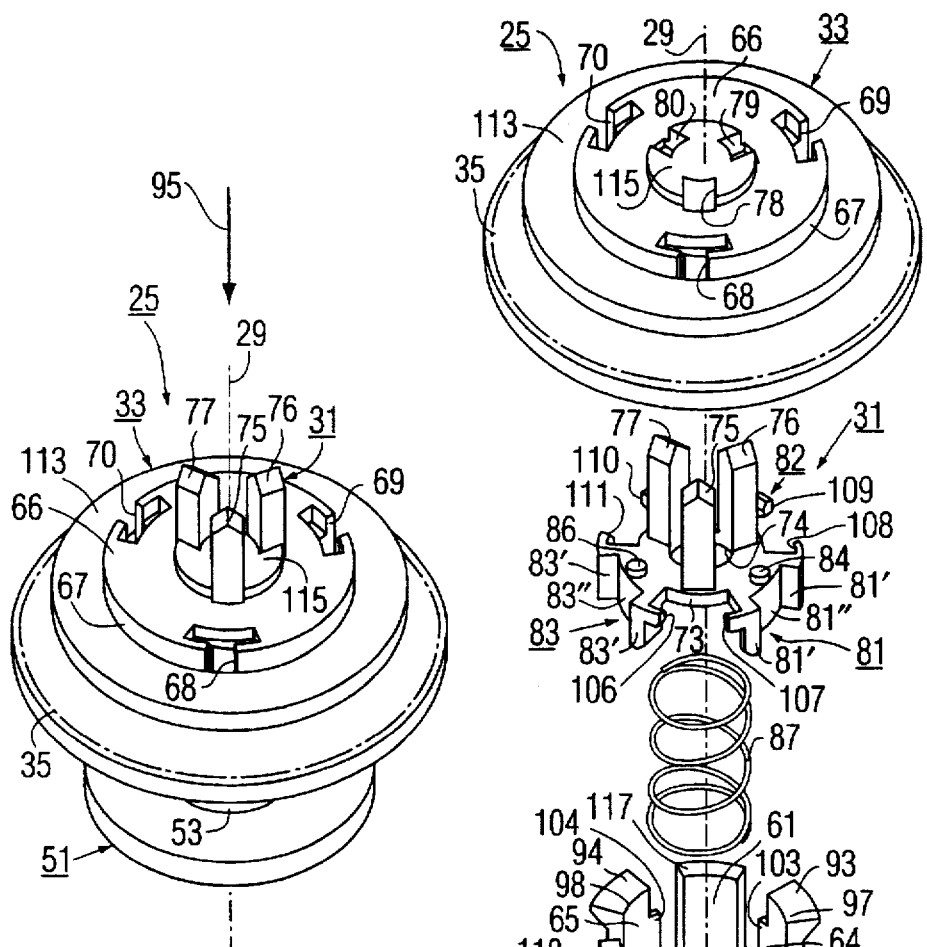
FIG. 7 shows a drive means of the apparatus of FIG. 1. adapted to cooperate with a reel of a larger magnetic-tape cassette. this drive means being shown in an assembled condition in part A of FIG. 7. in an exploded view in part B of FIG. 7. and in a plan view in part C of FIG. 7.

To cooperate with the reels 21 and 22 of the first magnetic-tape cassette 15 the video recorder 1 comprises a drive means 25 and 26, respectively, for each of them. The two drive means 25 and 26 are identical, for which reason the detailed construction of these two drive means 25 and 26 will be described only for the drive means 25. The drive means 25 is shown in detail in FIG. 7 and in FIGS. 24, 25 and 26.

To cooperate with the further reels 23 and 24 of the second magnetic-tape cassette 16 the video recorder 1 comprises a further drive means 27 and 28, respectively, for each of them. The two further drive means 27 and 28 are also identical, for which reason the detailed construction of these two further drive means 27 and 28 will be described only for the further drive means 27. The further drive means 27 is shown in detail in FIG. 8 and in FIGS. 9 to 23, the FIGS. 9 to 23 showing different operating conditions of the further drive means 27, which will be described in more detail hereinafter.

The two drive means 25 and 26 each comprise a reel spindle 31 and 32, respectively, which is rotationally drivable about an axis 29 and 30, respectively, for driving the relevant reel 21 or 22 and a respective reel disc 33 and 34, which is coaxial with the axis 29 and 30, respectively, to supporting the relevant reel 21 or 22. The reel disc 33 is integral and coaxial with a toothed wheel 35. The reel disc 34 is also integral and coaxial with a toothed wheel 36.

The two further drive means 27 and 28 each comprise a reel spindle 39 and 40, respectively, which is rotationally drivable about a further axis 37 and 38, respectively, for driving the relevant further reel 23 or 24 and a respective further reel disc 41 and 42, which is coaxial with the further axis 37 and 38, respectively, to support the relevant further reel 23 or 24. The further reel disc 41 is integral and coaxial with a further toothed wheel 43. The further reel disc 42 is also integral and coaxial with a further toothed wheel 44.

To drive the toothed wheels 35 and 43 there is provided a toothed drive wheel 46 which is rotatable about an axis 45 and which is in mesh with the two toothed wheels 35 and 43 in a rest condition of the video recorder 1. To drive the two toothed wheels 36 and 44 there is provided a toothed drive wheel 48 which is rotationally drivable about an axis 47 and which is likewise in mesh with the two toothed wheels 36 and 44 in a rest condition of the video recorder 1. To drive the two toothed drive wheels 46 and 48 there is provided a movable toothed drive wheel 50, which is rotationally drivable about an axis 49 and is supported on a movable carrier, not shown, which drive wheel 50 can be brought automatically into driving engagement with one of the two toothed drive wheels 46 and 48 in dependence upon its direction of rotation and by means of which either one of the two toothed wheels 36 and 44 is drivable via the drive wheel 48 or one of the two toothed wheels 35 and 43 is drivable via the drive wheel 46 in dependence upon the direction of rotation of said wheel 50. The reel discs 33, 34, 41 and 42 which are integral with the toothed wheels 35, 36, 43 and 44 as well as the reel spindles 31, 32, 39 and 40 which are rotationally coupled to the turntables 33, 34, 41 and 42 are also drivable via these toothed wheels.

The deck plate 2 carries the drive means 25 and 26, the two further drive means 27 and 28, the two toothed drive wheels 46 and 48, and the carrier, not shown, for the movable toothed drive wheel 50.

In the video recorder 1 shown in FIGS. 1 to 6 the two reel spindles 31 and 32 are each movable in the direction of the axis 29 or 30 between a driving position, in which the relevant reel spindle 31 or 32 is in driving engagement with the relevant reel 21 or 22 of the first magnetic-tape cassette 15, and a non-driving position, in which the relevant reel spindle 31 or 32 is situated outside the area occupied by the second magnetic-tape cassette 16 in its operating position. In this video recorder 1 the two reel discs 33 and 34 are each also movable in the direction of the axis 29 or 30 between a supporting position, in which the relevant reel disc 33 or 34 supports the respective reel 21 or 22 of the first magnetic-tape cassette 15, and a non-supporting position, in which the relevant reel disc 33 or 34 is situated outside the area occupied by the second magnetic-tape cassette 16 in its operating position.

However, advantageously, not only the reel spindles 31 and 32 and the reel discs 33 and 34 in the video recorder 1 shown in FIGS. 1 to 6 are axially movable as described above. In addition, the two further reel spindles 39 and 40 in the video recorder 1 are each movable in the direction of the respective further axis 37 or 38 between a driving position, in which the relevant further reel spindle 39 or 40 is in driving engagement with the relevant further reel 23 or 24 of the further magnetic-tape cassette 16, and a non-driving position, in which the relevant further reel spindle 39 or 40 is situated outside the area occupied by the first magnetic-tape cassette 15 in its operating position. Furthermore, the two further reel discs 41 and 42 are each also movable in the direction of the further axis 37 or 38 between a supporting position, in which the relevant further reel disc 41 or 42 supports the respective further reel 23 or 24 of the second magnetic-tape cassette 16, and a non-supporting position, in which the relevant further reel disc 41 or 42 is situated outside the area occupied by the first magnetic-tape cassette 15 in its operating position.

This has the advantage that in a particularly simple manner it is achieved that when a first and larger magnetic-tape cassette 15 is loaded in its operating position into the video recorder 1 the further reel spindles 39 and 40 and further reel discs 41 and 42 in the video recorder 1, which are not adapted to enter into driving engagement with the reels 21 and 22 in this larger magnetic-tape cassette 15, can be moved out of the area occupied by the larger magnetic-tape cassette 15 inserted in its operating position. This also has the advantage that in a particularly simple manner it is achieved that when a second and smaller magnetic-tape cassette 16 is loaded in its operating position into the video recorder 1 the reel spindles 31 and 32 and reel discs 33 and 34, which are not adapted to enter into driving engagement with the reels 23 and 24 in this smaller magnetic-tape cassette 16, can be moved out of the area occupied by the smaller magnetic-tape cassette 16 inserted in its operating position.

Figure 3:
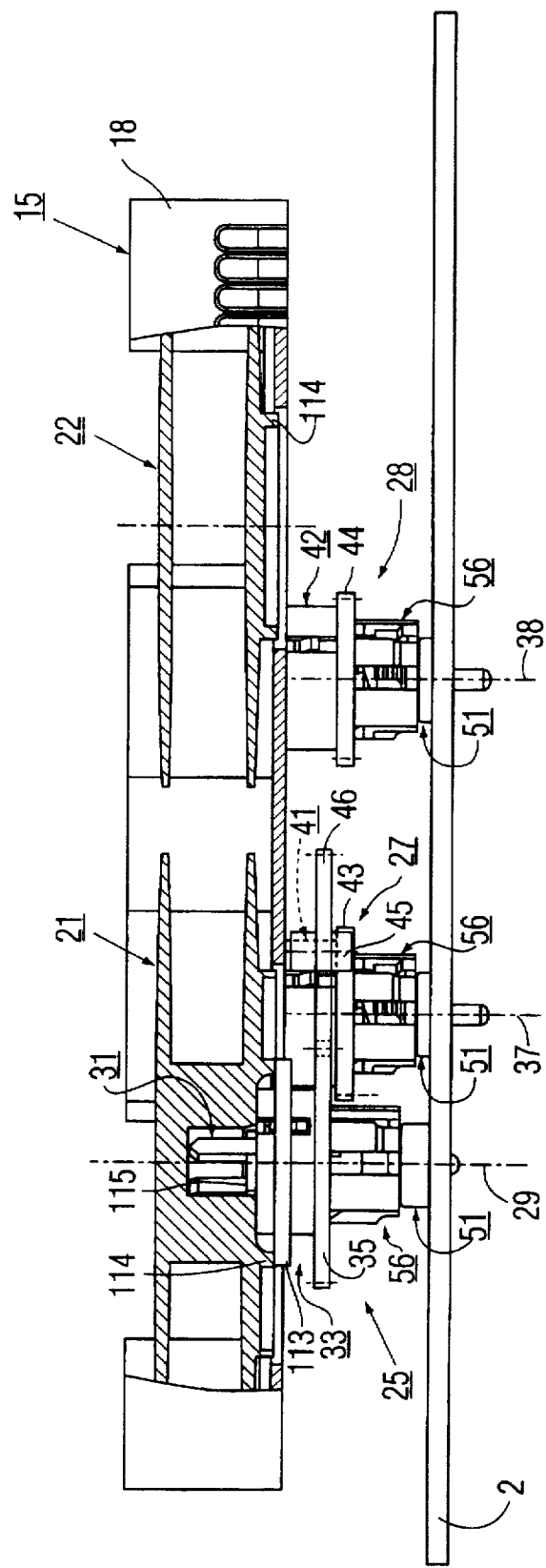
FIG. 3 is a sectional view taken on the line III—III in FIG. 1 and to the same scale as FIG. 2, showing a larger magnetic-tape cassette loaded into the apparatus of FIG. 1 and three of the drive means of the apparatus of FIG. 1. said drive means not being shown in sectional view.
Figure 4:
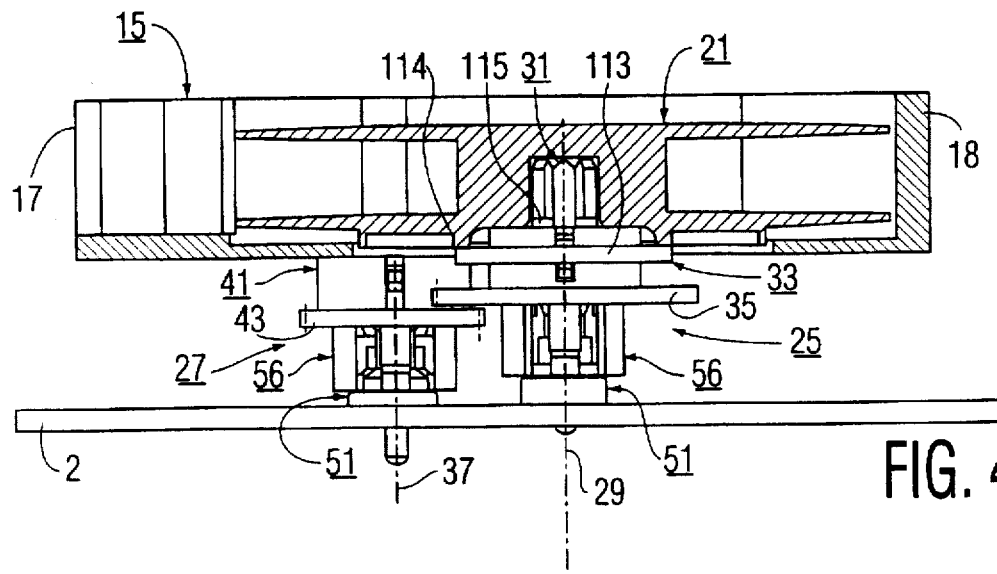
FIG. 4 is a sectional view taken on the line IV—IV in FIG. 1 and to the same scale as FIGS. 2 and 3. showing a larger magnetic-tape cassette loaded into the apparatus of FIG. 2 and two of the drive means of the apparatus of FIG. 1. said drive means not being shown in sectional view.
Figure 5:
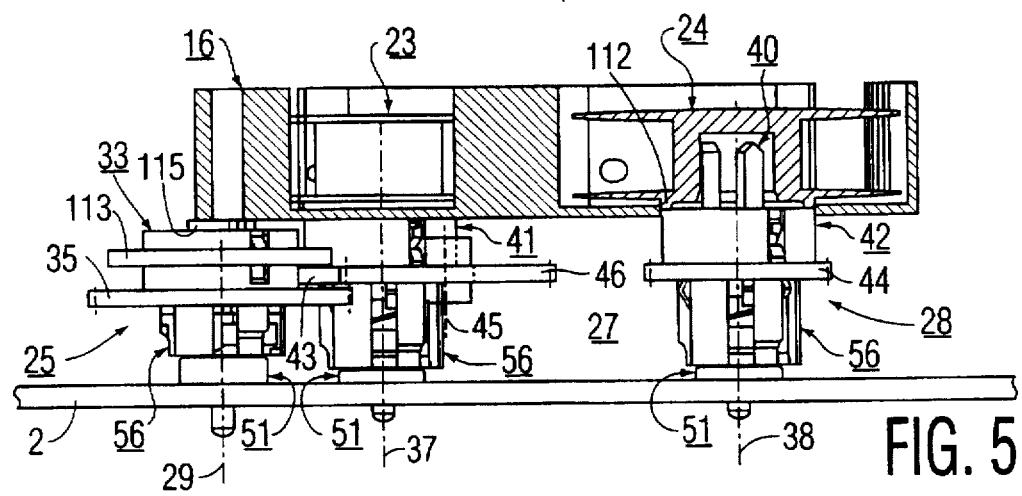
FIG. 5. in a way similar to FIG. 3. is a sectional view taken on the line III—III in FIG. 1. showing a smaller magnetic-tape cassette loaded into the apparatus of FIG. 1 and three of the drive means of the apparatus of FIG. 1. said drive means not being shown in sectional view.
Figure 6:
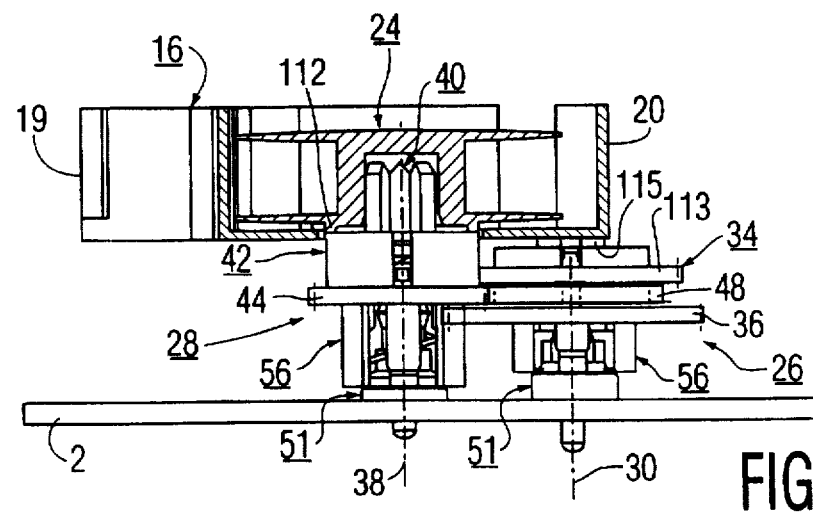
FIG. 6 is a sectional view taken on the line VI—VI in FIG. 1 and to the same scale as FIGS. 2. 3. 4 and 5. showing a smaller magnetic-tape cassette loaded into the apparatus of FIG. 1 and two of the drive means of the apparatus of FIG. 1. said drive means not being shown in sectional view.

When the reel discs 33 and 34 are in the non-supporting position the toothed wheels 35 and 36, which are integral with these reel discs 35 and 36, have been moved so far in the axial directions that the toothed wheels 35 and 36 are not in mesh with the toothed drive wheels 46 and 48, as is shown in FIGS. 5 and 6. Likewise, when the further reel discs 41 and 42 are in the non-supporting position the further toothed wheels 43 and 44, which are integral with these further reel discs 41 and 42, have been moved so far in the axial directions that the further toothed wheels 43 and 44 are not in mesh with the toothed drive wheels 46 and 48, as is shown in FIGS. 3 and 4. This ensures that the toothed wheels 35 and 36 and the further toothed wheels 43 and 44 cannot be driven when the when the reel discs 33 and 34 are in the non-supporting position and when the further reel discs 41 and 42 are in the non-supporting position, respectively.

The construction of the further drive means 27 and 28 of the video recorder 1 will now be described in detail by means of a description of the drive means 27 with reference to FIGS. 8 to 23.

The further drive means 27 comprises a plastics bearing disc 51, which is coaxial with the further axis 37 and which is locked against rotation to the deck plate 2 in a manner not shown, from which disc a hollow cylindrical bearing sleeve 52 extends, which is coaxial with the further axis 37. The bearing disc 51 has a raised annular portion 53 which together with the bearing sleeve 52 constitutes a race 54 for a bearing ball 55 mounted in the race 54.

A substantially pot-shaped plastics bearing member 56 is mounted on the bearing ball 55, which bearing member is coaxial with the further axis 37 and is rotatable about the further axis 37. The bearing member 56 has a pot-bottom wall 57 and a hollow cylindrical hub 58, which is integral with this pot-bottom wall, for rotatably supporting the bearing member 56. The hollow cylindrical hub 58 is slid onto the bearing sleeve 52 of the bearing disc 51 and is rotatable relative to the bearing sleeve 52. The bearing member 56 further comprises a hollow cylindrical circumferential pot wall 59. The circumferential pot wall 59 of the bearing member 56 comprises three first wall portions 60, 61 and 62, which are rigidly connected to the pot-bottom wall 57 and which are spaced at equal angles from one another, and three second wall portions 63, 64 and 65, which are pivotally connected to the pot-bottom wall 57 and which are spaced at equal angles from one another and angularly displaced relative to the first wall portions 60, 61 and 62. The pivotal connection between the wall portions 63, 64, 65 and the pot-bottom wall 57 is formed by means of integral hinges which are customary in plastics technology. The second wall portions 63, 64 and 65 are pivotably mounted by means of the integral hinges.

The further drive means 27 further comprises the further reel disc 41, which is made of a plastics. The further reel disc 41 is cap-shaped and has an upper cap wall 66 and a hollow cylindrical circumferential cap wall 67 which is integral with the upper cap wall 66. The further toothed wheel 43 is integral with the hollow cylindrical circumferential cap wall 67. The circumferential cap wall 67 has three openings 68, 69 and 70 which face the pivotable second wall portions 63, 64 and 65 of the circumferential pot wall 59 of the bearing member 56. The functions of the openings 68, 69 and 70 will be explained later. In its cap interior the further reel disc 41 has a bearing sleeve 71 which is integral with the upper cap wall 66. A bearing spindle 72 is press-fitted into the bearing sleeve 71 so as to be locked in rotation. The bearing spindle 72 is mounted in the bearing sleeve 52 of the bearing disc 51 and in the bearing disc 51 itself so as to be rotatable and axially movable.

The further reel spindle 39, which is also made of a plastics, is mounted in the cap interior of the further reel disc 41 so as to be coaxial with the further axis 37. The further reel spindle 39 has a mandrel disc 73 with a circular centre hole 74 through which the bearing sleeve 71 of the further reel disc 41 extends. Three coupling portions 75, 76 and 77 are integral with and project from the mandrel disc 73. Each of these three coupling portions 75, 76 and 77 extends from the cap interior of the further reel disc 41 through an aperture 78, 79 and 80, respectively, in the upper cap wall 66 of the further reel disc 41, so that the further reel spindle 39 and the further reel disc 41 interlock to transmit rotary movement. The coupling portions 75, 76 and 77 are engageable with the coupling portions on the hub of the further reel 23 of a smaller magnetic-tape cassette 16 and serve for the rotary drive of the further reel 23. As long as the coupling portions 75, 76 and 77 are in driving engagement with the coupling portions on the hub of the further reel 23 in the driving position of the further reel spindle 39, the further reel 23 will be supported by the further reel disc 41, which is then in its supporting position, as is shown for the further reel 24 in FIGS. 5 and 6, so that the relevant further reel 24 is held in an accurately defined vertical position. The coupling portions 75, 76 and 77 are circularly rounded at their bounding surfaces which face one another, which bounding surfaces are flush with the bounding surface of the hole 74, so that during an axial movement of the further reel spindle 39 relative to the further reel disc 41 the coupling portions 75, 76 and 77 are movable along the bearing sleeve 71 of the further reel disc 41 with these rounded bounding surfaces and can thus be guided by the bearing sleeve 71.

Three substantially channel-shaped elements 81, 82 and 83, which are spaced at equal angles from one another and which have substantially U-shaped cross-sections, are integral with the mandrel disc 73. The first wall portions 60, 61 and 62 of the circumferential pot wall 59 of the bearing member 56 engage between the limbs 81', 82' and 83' of the channel-shaped elements 81, 82 and 83, the facing bounding surfaces of the first wall portions 60, 61 and 62 being situated opposite the base portions 81", 82" and 83". The elements 81, 82 and 83 provide a further interlock between the further reel spindle 39 and the further reel disc 41 to transmit rotary movement.

Figure 9:
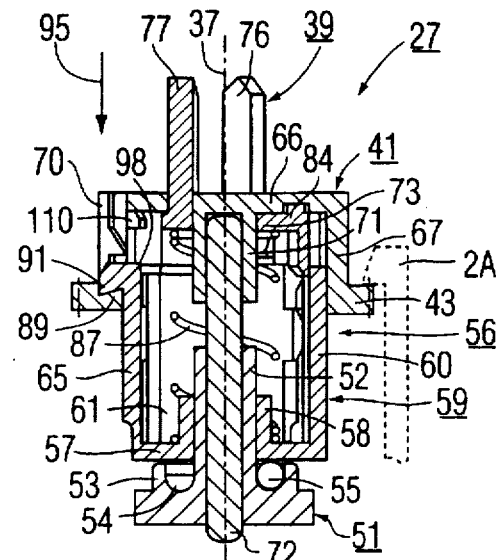
FIG. 9 shows the drive means of FIG. 8 in a sectional view taken on the line IX—IX in part C of FIG. 8.

Three circularly cylindrical raised portions 84, 85 and 86 project from the mandrel disc 73 and in the further drive means 27 they engage in openings in the upper cap wall 66 of the further reel disc 41, as is shown, for example, in FIG. 9 for the raised portion 84 and the opening 87. The raised portions 84, 85 and 86 have no function in the further drive means 27. However, these raised portions 84, 85 and 86 have a function in the drive means 25 and 26, in which the construction of the reel spindles is the same as in the further drive means 27 and 28. In the drive means 25 and 26 the first reel disc 33 or 34 is supported on these raised portions 84, 85 and 86 with its upper cap wall 66 when the reel spindle is in its driving position and the reel disc is in its supporting position. This results in different relative positions of the reel discs 33, 34 and 41, 42 with respect to the reel spindles 31, 32 and 39, 40, respectively, of the different drive means 25, 26 and 27, 28, respectively, in order to drive the reels 21, 22 and 23, 24 of a larger magnetic-tape cassette 15 and a smaller magnetic-tape cassette 16, respectively, as required for the two magnetic-tape cassettes 15 and 16 owing to the construction of these cassettes.

As is apparent from FIGS. 8 to 23, the bearing member 56 serves for rotatably supporting the further reel disc 41 and the further reel spindle 39 which is coaxial with this reel disc, the circumferential pot wall 59 of the bearing member 56 extending into the cap interior of the further reel disc 41. The further reel disc 41 is axially movable along the circumferential pot wall 59 with its circumferential cap wall 67.

The interior of the bearing member 56 accommodates a pressure spring 87 which acts in an axial direction on the pot-bottom wall 57 of the bearing member 56 and on the further reel spindle 39, i.e. on the mandrel disc 73 of this reel spindle. To take up the force of the pressure spring 87 the further reel disc 41 comprises three first limiting stops which are spaced at equal angles from one another, of which only two stops are visible in FIGS. 8 to 23, i.e. the first limiting stop 88 in FIG. 8 and the first limiting stop 89 in FIGS. 9, 12, 15, 18 and 21. To take up the force of the pressure spring 87 the bearing member 56 further comprises three second limiting stops adapted to cooperate with the first limiting stops 88 and 89 and also spaced at equal angles from one another, of which only two stops are visible in FIGS. 8 to 23, i.e. the two second limiting stops 90 and 91 in FIG. 8 and the second limiting stop 91 in FIGS. 9, 12, 15, 18 and 21. As is apparent from FIGS. 8 to 23, the second limiting stops 90 and 91 of the bearing member 56, which have been provided to take up the force of the pressure spring 87, are each formed by a latching hook which projects radially from a second wall portion 63, 64 or 65 of the bearing member 56, which wall portions are pivotally connected to the pot-bottom wall 57. Each latching hook projects into one of the three openings 68, 69 and 70 in the circumferential cap wall 67 of the further reel disc 41 and engages over a latching recess forming the first limiting stop 88 or 89 and situated in the transitional area between the circumferential cap wall 67 and the further toothed wheel 43. The latching hooks and the openings 68, 69 and 70 provide an interlock between the bearing member 56 and the further reel disc 41 to transmit rotary movement.

Assembly and mounting of the further drive means 27 is effected very simply in that the bearing spindle 72 is press-fitted into the bearing sleeve 71 of the further reel disc 41, after which the further reel spindle 39 is fitted into the further reel disc 41, the coupling portions 75, 76 and 77 being passed through the apertures 78, 79 and 80 in the upper cap wall 66, and subsequently the pressure spring 87 is slid onto the bearing spindle 72 and then the bearing member 56 is slid with its open end into the cap interior of the further reel disc 41, the latching hooks provided as second limiting stops 90 and 91 engaging in the latching recesses provided as first limiting stops 88 and 89, so that an assembled structural unit is obtained. This unit is then placed onto the bearing sleeve 52 of the bearing disc 51 with the hollow cylindrical hub 58 of the bearing member 56, the pot-bottom wall 57 of the bearing member 56 then bearing on the bearing ball 55. In order to secure the entire unit in the axial direction at least one latching hook 2A has been provided, which hook is pivotally connected to the deck plate 2 and, when the unit is placed onto the bearing disc 51, is pivoted by the further toothed wheel 43, after which it engages over the further toothed wheel 43, as is shown diagrammatically in dotted lines in FIG. 9.

The further drive means 27 comprises three further supporting stops 92, 93 and 94 for the further reel disc 41, which are each movable between a blocking position and a release position, which stops in their blocking position can support the further reel disc 41 in its supporting position and can thereby block this reel disc against axial movement towards its non-supporting position, and which when moved into their release position allow the further reel disc 41 to be moved into its non-supporting position. The direction of movement of the further reel disc 41 from its supporting position into its non-supporting position is indicated by an arrow 95 in FIGS. 8 to 23. The three supporting stops 92, 93 and 94 for the further reel disc 41 are each formed by a wedge-shaped radial projection on a second wall portion 63, 64 and 64, respectively, at the location of the respective free end 96, 97 or 98 of this second wall portion 63, which free ends are remote from the pot-bottom wall 57. To cooperate with each wedge-shaped projection forming a supporting stop 92, 93 or 94 the further reel disc 41 comprises an outwardly directed wedge-shaped radial counter-projection. Thus, for the three wedge-shaped projections forming the supporting stops 92, 93 and 94 the further reel disc 41 comprises three such counter-projections, of which only one counter-projection 99 is visible in FIGS. 10, 13, 16, 19 and 22. Each of the counter-projections bears upon the respective supporting stop 92, 93 or 94 on the bearing member 56 when the further reel 23 is correctly supported by the further reel disc 41.

Two wedge-shaped control portions 100, 101; 102, 103 and 104, 105 project laterally in a circumferential direction from each respective second wall portion 63, 64 or 64 of the bearing member 56, which wall portions are pivotally connected to the pot bottom 57 of the bearing member 56. For each of these control portions 100, 101; 102, 103 and 104, 105 the further reel spindle 39 comprises an actuating portion 106, 107, 108, 109, 110 and 111, respectively. By means of each of the actuating portions 106, 107, 108, 109, 110 and 111 the corresponding control portion 100, 101, 102, 103, 104 or 105 and the second wall portion 63, 64 or 65 carrying the relevant control portion is movable in an outward radial direction when the further reel spindle 39 is axially moved in the direction indicated by the arrow 95 into its non-driving position, so that the wedge-shaped projection on each second wall portion 63, 64 or 65 of the bearing member 56, which projection forms a supporting stop 92, 93 or 94, can be moved out of the range of movement of the counter-projection 99 on the further reel disc 41.

Thus, between the further reel spindle 39 and each supporting stop 92, 93 or 94 for the reel disc 43, which is coaxial with the reel spindle 39, the further drive means 27 include means 100, 101, 102, 103, 104, 105, 106, 107, 108, 109, 110 and 111 for moving each respective supporting stop 92, 93 or 94. During an axial movement of the further reel spindle 39 in the direction indicated by the arrow 95 between its driving position and its non-driving position the supporting stops 92, 93 and 94 are movable from their blocking position into their release position by said means 100 to 111. Furthermore, by inserting a first and larger magnetic-tape cassette 15 in its operating position the further reel spindle 39, which is not suited for driving a reel 21 or 22 in this larger magnetic-tape cassette 15, is movable into its non-driving position by cooperation with the housing of this larger magnetic-tape cassette 15 the supporting stops 92, 93 and 94 are movable into their release position with the aid of the means 100 to 111 for moving these supporting stops 92, 93 and 94 and, as a consequence, the further reel disc 41 is movable into its non-supporting position by cooperation with the housing of the larger magnetic-tape cassette 15.

The further reel spindle 39 thus constitutes a detection means for detecting the presence of a larger magnetic-tape cassette 15 in the video recorder 1 and, upon detection of a larger magnetic-tape cassette 15, it is moved so far that via the means 100 to 111 for moving the supporting stops 92, 93 and 94 it causes these supporting stops 92, 93 and 94 to be moved, thereby allowing axial movement of the further reel disc 41, after which the further reel disc 41 is moved out of the area occupied by the larger magnetic-tape cassette 15 in its operating position by means of this cassette 15, i.e. without any separate actuating means.

Different operating conditions of the further drive means 27 and 28 for driving engagement with the further reels 23 and 24 of a smaller magnetic-tape cassette 16 will now be described for the further drive means 27 with reference to FIGS. 9 to 23.

Figure 2:
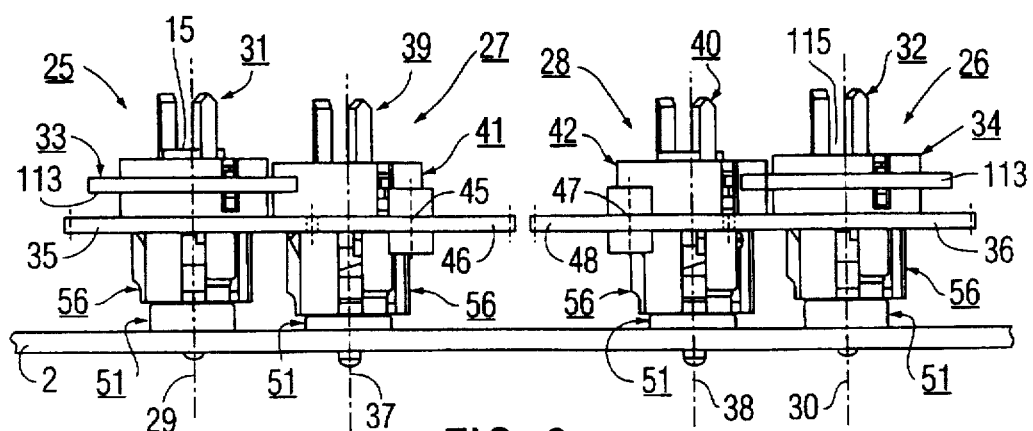
FIG. 2 shows the four drive means of the apparatus of FIG. 1 to a larger scale than FIG. 1, in a view as indicated by the arrow II in FIG. 1, no cassette being present in this apparatus and the four drive means each being in a rest condition.
Figure 10:
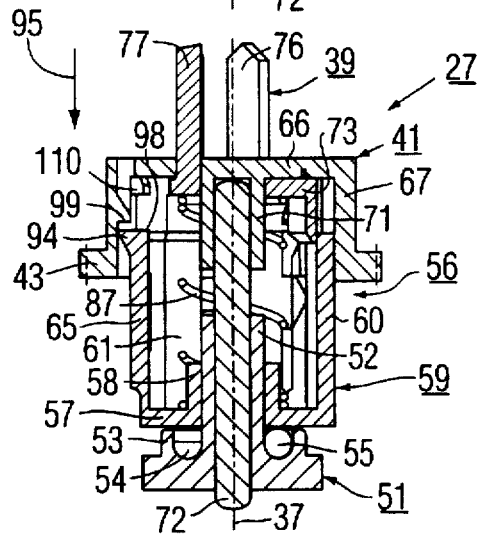
FIG. 10 shows the drive means of FIG. 8 in a sectional view taken on the line X—X in part C of FIG. 8.
Figure 11:
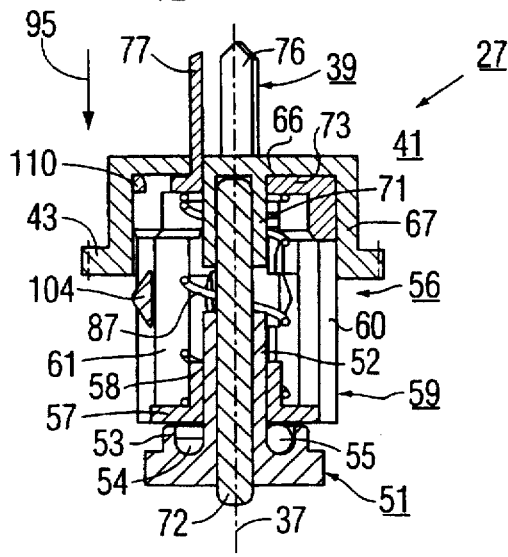
FIG. 11 shows the drive means of FIG. 8 in a sectional view taken on the line XI—XI in part C of FIG. 8.

FIGS. 9, 10 and 11 show an operating condition of the further drive means 27, which corresponds to the operating condition shown in FIG. 2 and in which no magnetic-tape cassette is present in the video recorder 1 shown in FIG. 1. In this operating condition the pressure spring 87 urges the further reel spindle 39 and, via this spindle, the further reel disc 41 into the uppermost position, in which the first limiting stops formed by the latching recesses 88 and 89 engage with the second limiting stops 90 and 91 formed by latching hooks.

Figure 12:
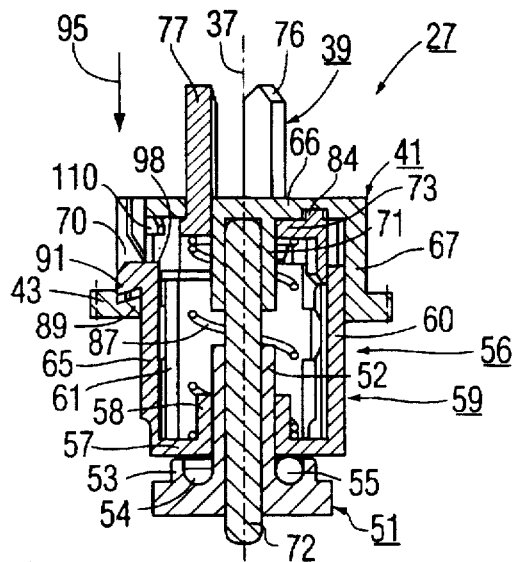
FIGS. 12. 13 and 14. in a way similar to FIGS. 9, 10 and 11. show the drive means of FIG. 8 with a smaller magnetic-tape cassette loaded into the apparatus of FIG. 1 and with the drive means being in an operating condition as occurs during cooperation with a reel of a smaller magnetic-tape cassette.
Figure 13:
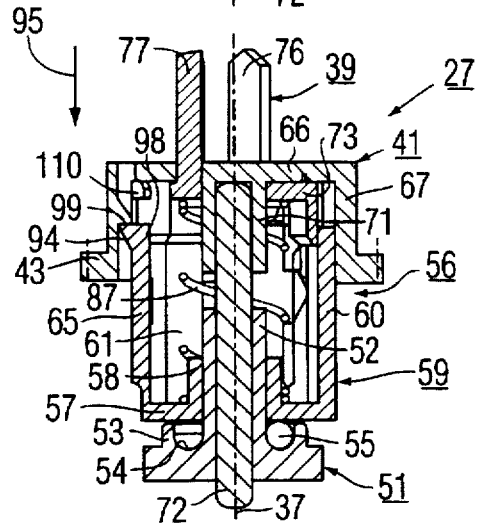
Figure 14:
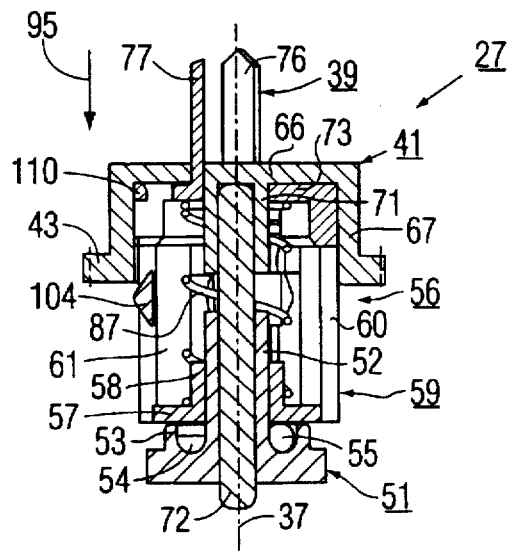

FIGS. 12, 13 and 14 show another operating condition of the further drive means 27, which corresponds to the operating condition shown in FIGS. 5 and 6, in which a second and smaller magnetic-tape cassette 16 has been loaded into the video recorder 1 in its operating position. In said operating condition the further reel spindle 39 is in its driving position and the further reel disc 41 is in its supporting position. The coupling portions 75, 76 and 77 of the further reel spindle 39 then engage correctly with the coupling portions on the hub of the further reel 23 of a smaller magnetic-tape cassette 16 and the further reel disc 41 correctly supports the further reel 23 of a smaller magnetic-tape cassette 16, as is shown in FIGS. 5 and 6. As is apparent from FIGS. 5 and 6, the further reel 23 (as well as the further reel 24) then bears on the upper cap wall 66 of the further reel disc 41 with a raised annular portion 112. In the supporting position of the further reel disc 41 the further reel 23 on the further reel disc 41 moves this reel 23 slightly out of its rest position shown in FIGS. 9, 10 and 11 in the direction indicated by the arrow 95. The further reel disc 41 then bears on the supporting stops 92, 93 and 94 with its counter-projections 99, as is shown in FIG. 13, thereby assuring an exact vertical positioning of the further reel disc 41 and, as a consequence, of the further reel 23 supported by it.

Figure 15:
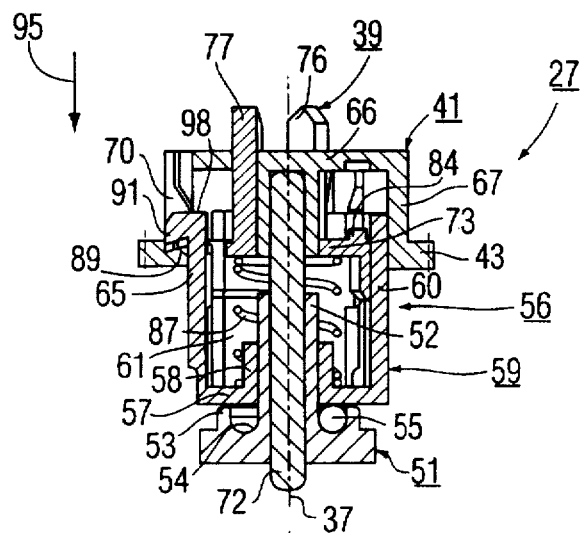
FIGS. 15. 16 and 17. in a way similar to FIGS. 9, 10 and 11. show the drive means of FIG. 8 with a smaller magnetic-tape cassette loaded into the apparatus of FIG. 1 but with the reel spindle of the drive means of FIG. 8 not yet being in engagement with the hub of the reel of this smaller magnetic-tape cassette which can be driven by this spindle.
Figure 16:
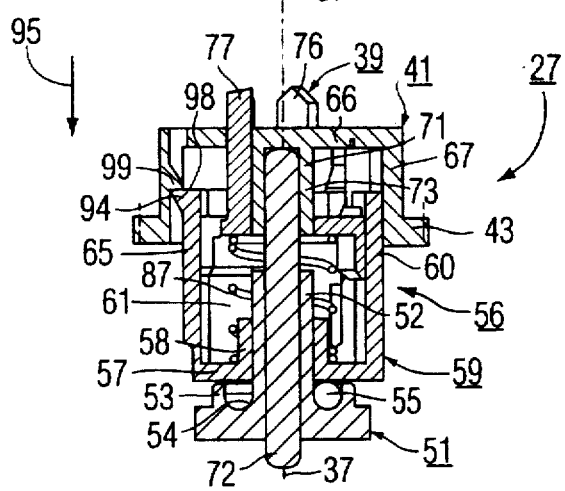
Figure 17:
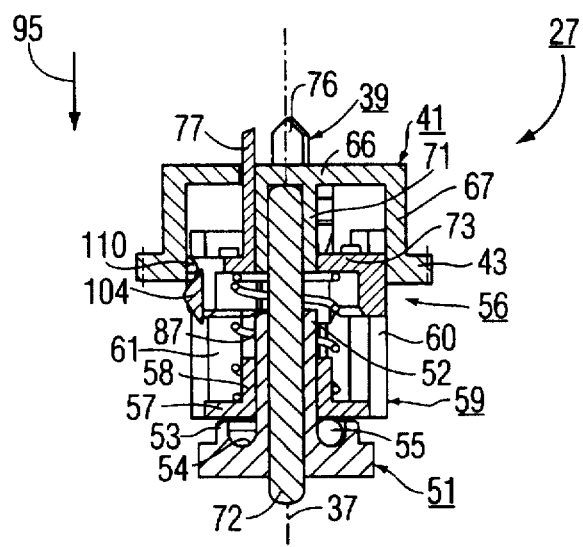

FIGS. 15, 16 and 17 represent an operating condition in which a smaller magnetic-tape cassette 16 has been loaded into the video recorder 1 and in which the further reel disc 41 occupies its supporting position already described with reference to FIGS. 12, 13 and 14 but in which the further reel spindle 39 has not yet correctly engaged the hub of a further reel 23 of a smaller magnetic-tape cassette 16 with its coupling portions 75, 76 and 77 but is held in a displaced position in the direction of the arrow 95 by the coupling portions inside the hub. This operating condition is simply cancelled in that the further reel disc 41 and hence the further reel spindle 39 are driven and are thus set into rotation, upon which the coupling portions 75, 76 and 77 are rotated relative the coupling portions inside the hub of a further reel 23 of a smaller magnetic-tape cassette 16 and properly engage the hub of the further reel 23.

Figure 18:
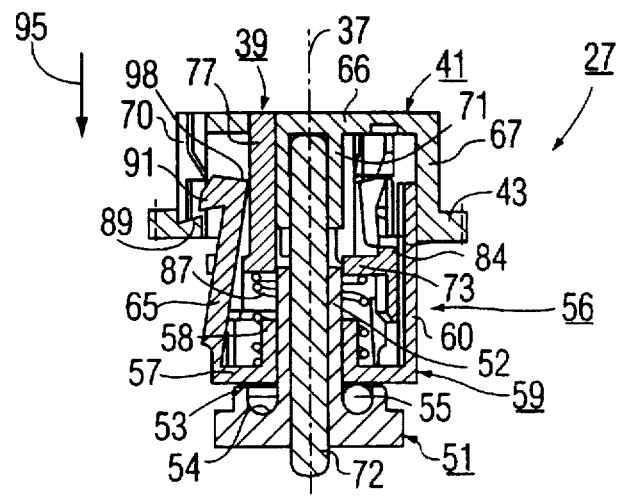
FIGS. 18. 19 and 20. in a way similar to FIGS. 9, 10 and 11. show the drive means of FIG. 8 with a larger magnetic-tape cassette loaded into the apparatus of FIG. 1. the reel spindle and the reel disc of the drive means of FIG. 8 being axially moved by the larger magnetic-tape cassette into an operating condition in which all the parts of the drive means shown in FIG. 8 are situated outside the area occupied by the larger magnetic-tape cassette.
Figure 19:
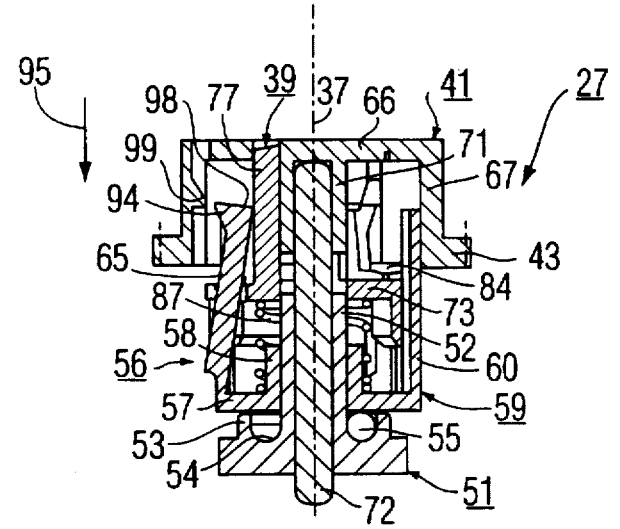
Figure 20:
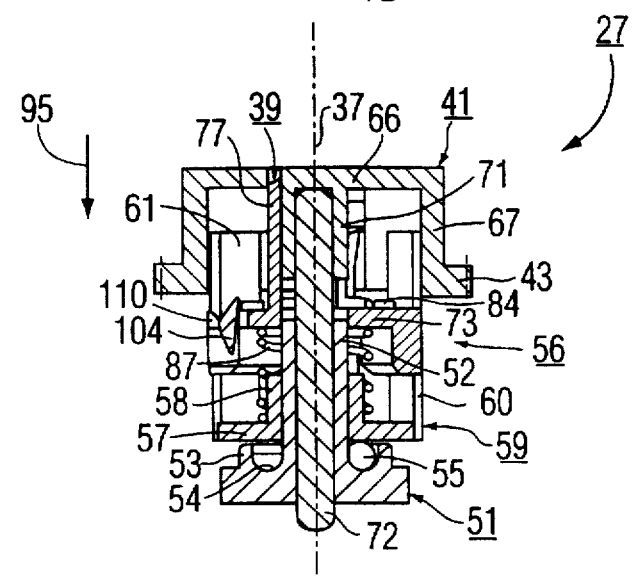

However, the operating condition of the further drive means 27 as shown in FIGS. 15, 16 and 17 also occurs in the case of another operational situation. It occurs if a first and larger magnetic-tape cassette 15 is loaded in its operating position into the video recorder 1 shown in FIG. 1. As the larger magnetic-tape cassette 16 is moved into its operating position its housing will strike against the coupling portions 75, 76 and 77 of the further reel spindle 39, upon which the coupling portions 75, 76 and 77 are moved in the direction of the arrow 95 by the housing of the larger magnetic-tape cassette 15, which portions then briefly occupy the intermediate positions shown in FIGS. 15, 16 and 17. When a larger magnetic-tape cassette 15 is moved into its operating position, however, the coupling portions 75, 76 and 77 of the further reel spindle 39 and hence the entire reel spindle 39 will be moved further in the direction of the arrow 95 by the housing of the larger magnetic-tape cassette 15, as is shown in FIGS. 18, 19 and 20. During this further movement of the further reel spindle 39 the means 100 to 111 for moving the supporting stops 92, 93 and 94 are activated. The actuating portions 106, 107, 108, 109, 110 and 111 of the further reel spindle 39 then enter into operational engagement with the second wall portions 63, 64 and 65, which are pivotally connected to the pot-bottom wall 57, so that the second wall portions 63, 64 and 65 and thus the supporting stops 92, 93 and 94 are pivoted so far that the supporting stops 92, 93 and 94 are moved out of the path of movement of the counter-projections 99, which were previously situated on these stops. As a result, the further reel disc 41 is then no longer blocked against movement in the direction indicated by the arrow 95. Therefore, the further reel disc 41 together with the further reel spindle 39 can then be moved further in the direction of the arrow 95 by the housing of the larger magnetic-tape cassette 15, i.e. so far that the operating condition shown in FIGS. 21, 22 and 23 is reached.

Figure 21:
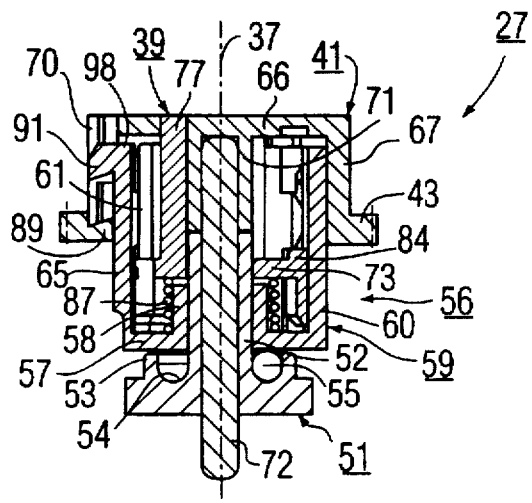
FIGS. 21. 22 and 23. in a way similar to FIGS. 9, 10 and 11 show the drive means of FIG. 8. all the parts of the drive means being situated outside the area occupied by a larger magnetic-tape cassette loaded into the apparatus of FIG. 1.
Figure 22:
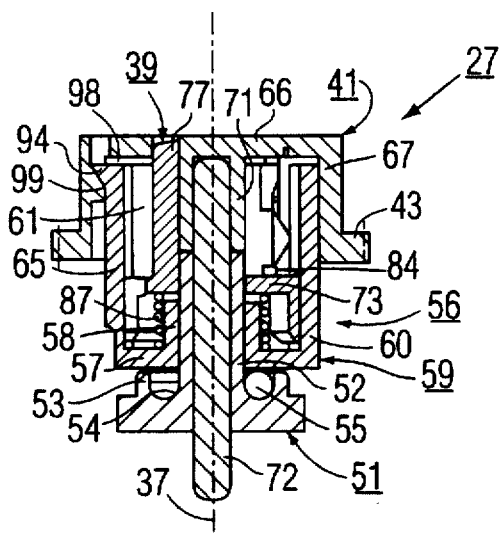
Figure 23:
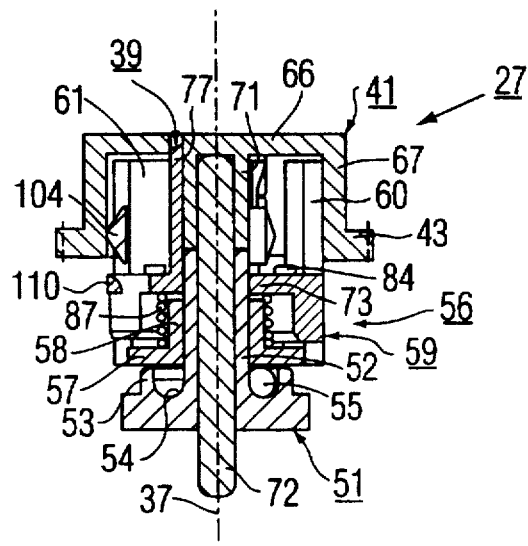

In the operating condition shown in FIGS. 21, 22 and 23 the further reel spindle 39 is in its non-driving position, in which it is situated outside the area occupied by the larger magnetic-tape cassette 15 in the operating position of the latter. The further reel disc 41 is then in its non-supporting position, in which it is likewise situated outside the area occupied by the larger magnetic-tape cassette 15 in the operating position of the latter. The operating condition shown in FIGS. 21, 22 and 23 corresponds to the operating condition shown in FIGS. 3 and 4. In the operating condition shown in FIGS. 21, 22 and 23 there is a small distance between the free ends 96, 97 and 98 of the second wall portions 63, 64 and 65, which are pivotally connected to the pot-bottom wall 57, and between the free ends of the first wall portions 60, 61 and 62, which are rigidly connected to the pot-bottom wall 57, so that there is a clearance between the free end of the circumferential pot wall 59 and the upper cap wall 66 in the operating condition shown in FIGS. 21, 22 and 23. It is to be noted that the height of the second wall portions 63, 64 and 65, which are pivotally connected to the pot-bottom wall 57, is slightly smaller than the height of the first wall portions 60, 61 and 62, which are rigidly connected to the pot-bottom wall 57.

The two drive means 25 and 26 will now be described by a description of the drive means 25 with reference to FIGS. 7, 24, 25 and 26. The drive means 25 with the reel spindle 31 and the reel disc 33 also comprises a bearing disc 51, a substantially pot-shaped plastics bearing member 56 and a pressure spring 87. It is to be noted that the bearing member 56, the pressure spring 87 and the reel spindle 31 of the drive means 25 are identical to the bearing member 56, the pressure spring 87 and the further reel spindle 39 of the further drive means 27. The reel disc 33 of the drive means 25, however, is of another construction than the further reel disc 41 of the further drive means 27.

The reel disc 33 is also essentially cap-shaped and has an upper cap wall 66 and a hollow cylindrical circumferential cap wall 67 which is integral with a toothed wheel 35. However, the reel disc 33 in addition has a supporting ring 113, which is integral with the circumferential cap wall 67. This supporting ring 113 serves to support the reel 21 or 22 of a large magnetic-tape cassette 15, the reel 21 (as well as the reel 22) having a raised annular portion 114, which bears on the supporting ring 113 of the reel disc 33 when the reel disc 33 is in its supporting position, as is shown in FIGS. 3 and 4.

In the area of its upper cap wall 66 the reel disc 33 has a circularly cylindrical raised portion 115. In the non-supporting position of the reel disc 33 this raised portion serves for vertically positioning a second and smaller magnetic-tape cassette 16, when such a smaller magnetic-tape cassette 16 is in its operating position, as is shown in FIGS. 5 and 6. As can be seen in FIGS. 5 and 6, a smaller magnetic-tape cassette 16 lies on the raised portions of the reel discs 33 and 34 at the location of the rear 20 of the cassette. Thus, the reel discs 33 and 34 not only have a supporting function but they are also used as positioning means. In order to ensure an exact vertical positioning of a smaller magnetic-tape cassette 16 the reel discs 33 and 34 an exact vertical positioning of these reel discs 33 and 34 is necessary. How this exact vertical positioning of the reel discs 33 and 34 is achieved will be described hereinafter.

The drive means 25 also has supporting stops 92, 93 and 94 for the reel discs 33, which stops are movable between a blocking position and a release position. In their blocking position these supporting stops 92, 93 and 94 can support the reel disc 33 in its supporting position and can thereby block this reel disc against axial movement towards its non-supporting position. When moved into their release position the three supporting stops 92, 93 and 94 allow the reel disc 33 to be moved into its non-supporting position.

To move the supporting stops 92, 93 and 94 the drive means 25 with the reel spindle 31 and the reel disc 33 comprises the same means 100 to 111 as the further drive means 27 with the further reel spindle 39 and the further reel disc 41.

In the case of the reel disc 33 there have also been provided three first limiting stops 88 and 89 and three second limiting stops 90 and 91, adapted to cooperate with the first limiting stops 88 and 89, in order to hold the bearing member 56 and the reel disc 33 together.

Figure 24:
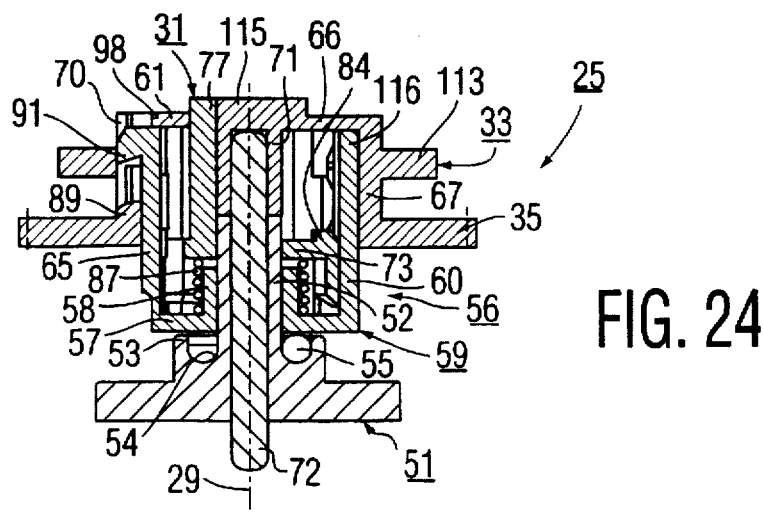
FIGS. 24. 25 and 26. in a way similar to FIGS. 21, 22 and 23. show the drive means of FIG. 7 for cooperation with a reel of a larger magnetic-tape cassette in sectional views taken on the lines XXIV—XXIV. XXV—XXV and XXVI—XXVI in part C of FIG. 7. the drive means of FIG. 7 being in an operating condition in which all the parts of the drive means. i.e. also its reel spindle and its reel disc. are situated outside the area occupied by a smaller magnetic-tape case loaded into the apparatus of FIG. 1.
Figure 25:
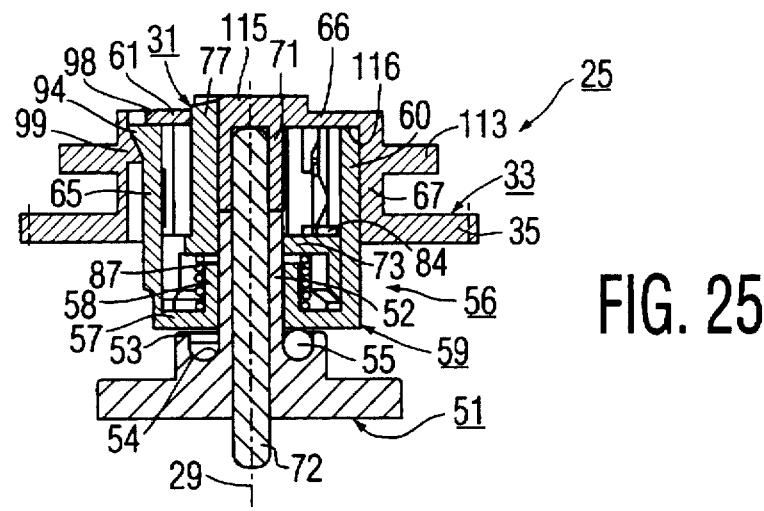
Figure 26:
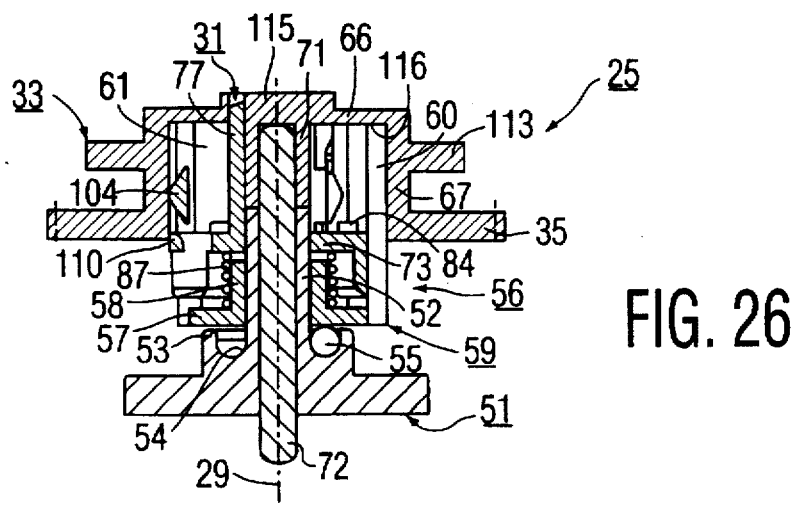
Figures 27A, 27B, 27C:
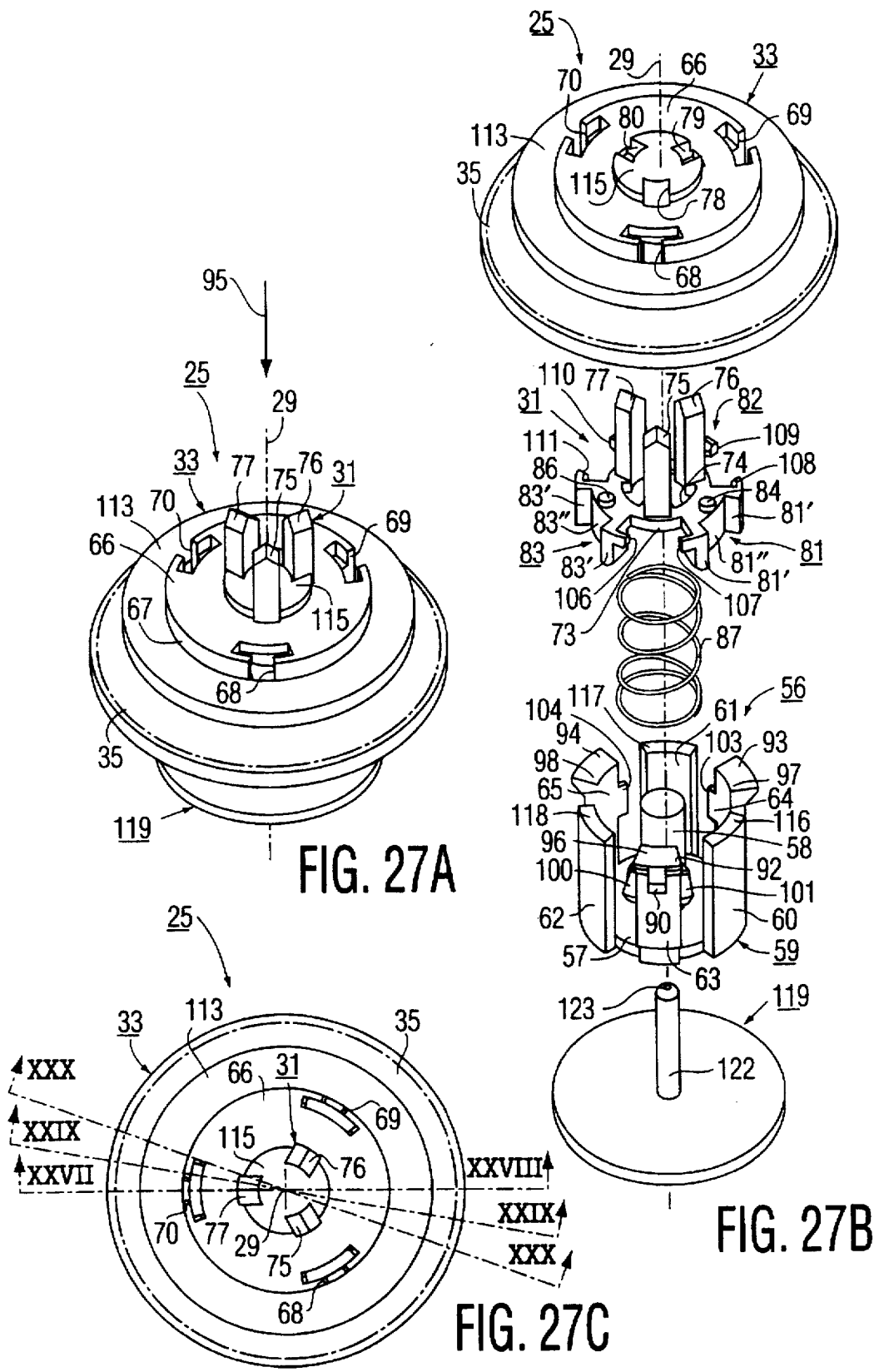
FIG. 27. in way similar to FIG. 7. shows a drive means of a recording and reproducing apparatus in accordance with a second embodiment of the invention. which drive means is adapted to cooperate with a reel of a larger magnetic-tape cassette.
Figure 28:
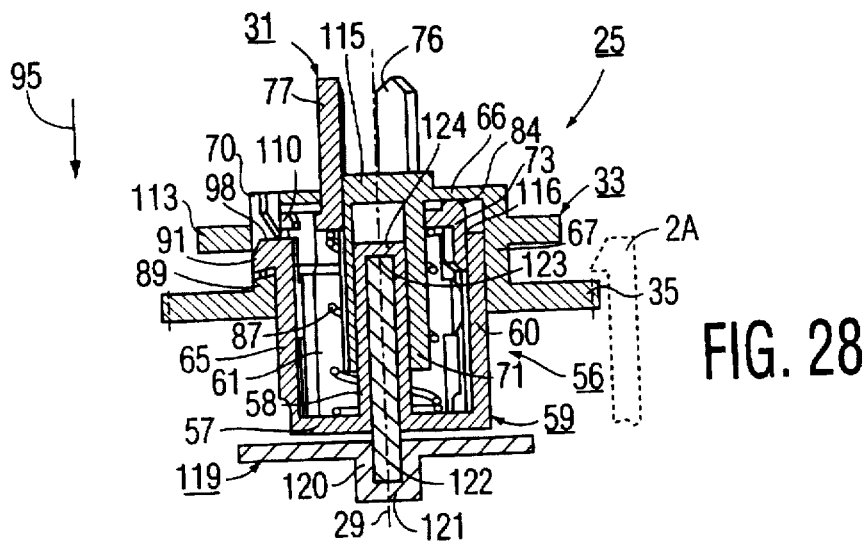
FIGS. 28. 29 and 30 show the drive means of FIG. 27 in sectional views taken on the lines XXVIII—XXVIII. XXIX-XXX and XXX—XXX in part C of FIG. 27. the drive means being in an operating condition occupied during cooperation with a reel of a larger magnetic-tape cassette.
Figure 29:
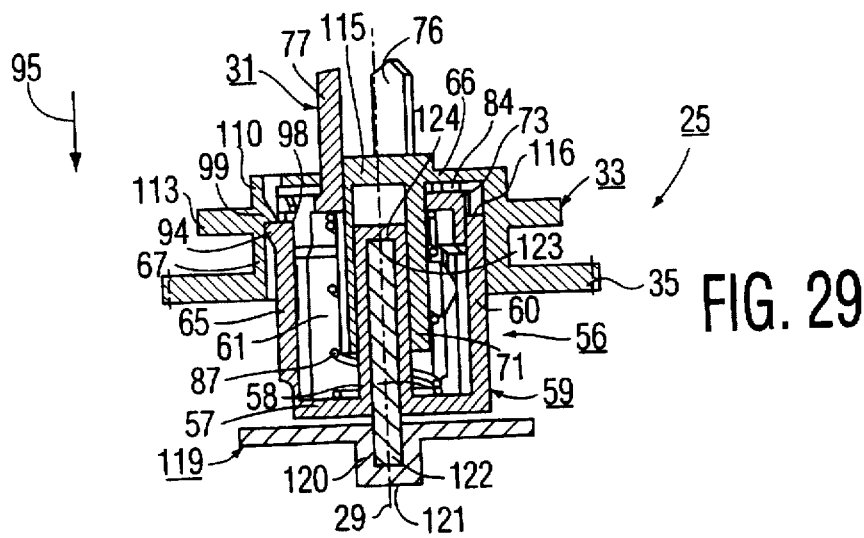
Figure 30:
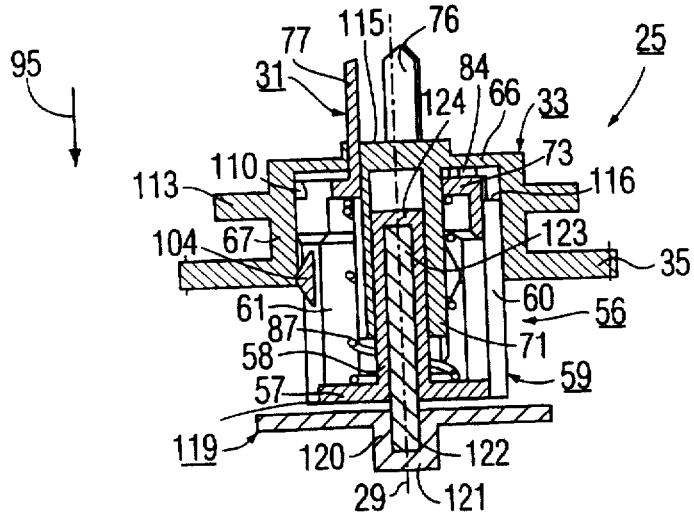
Figure 31:
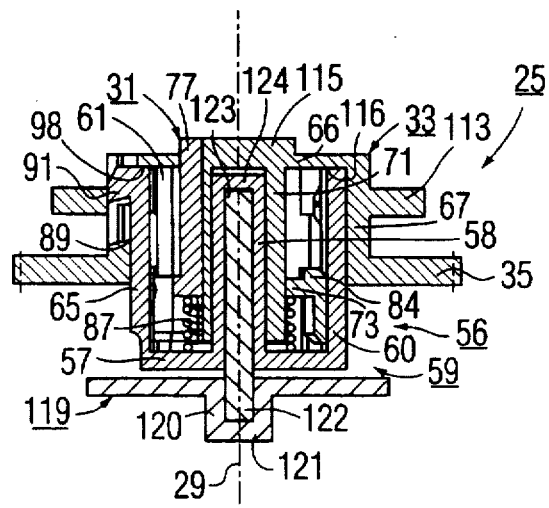
FIGS. 31. 32 and 33. in a way similar to FIGS. 28, 29 and 30. show the drive means of FIG. 27. the drive means being in an operating condition occupied when a larger magnetic-tape cassette has been loaded into the apparatus comprising this drive means.
Figure 32:
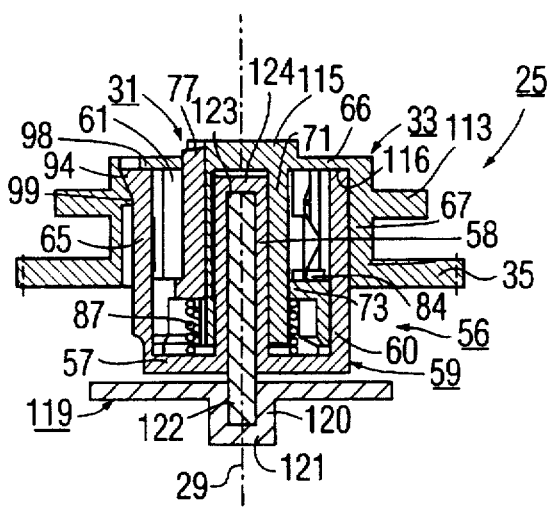
Figure 33:
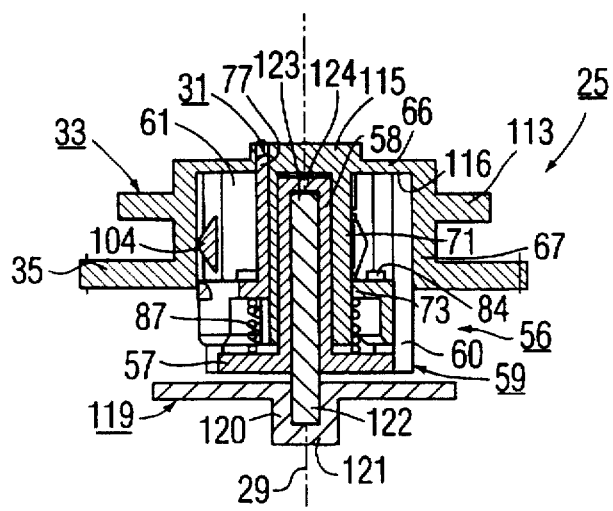

As stated above, the central raised portion 115 of the reel disc 33 serves for the vertical positioning of a smaller magnetic-tape cassette 16 at the location of the rear 20 of this cassette. Thus, with the aid of its raised portion 115 the reel disc 33 forms a positioning element for a smaller magnetic-tape cassette 16 which is not adapted to enter into driving engagement with the reel disc 33 and the reel spindle 31 which is coaxial with the latter. After the supporting stops 92, 93 and 94 for the reel disc 33 have been moved into their release positions the reel disc 33, i.e. its raised portion 115, supports the smaller magnetic-tape cassette 16, which is not adapted to enter into driving engagement with the reel disc 33 and the reel spindle 31 and which has been inserted in its operating position, when the reel spindle 31 is in its non-driving position and the reel disc 33 is in its non-supporting position. Said operating condition, in which the reel spindle 31 is in its non-driving position and the reel disc 33 is in its non-supporting position, is shown in FIGS. 24, 25 and 26 and also in FIGS. 4 and 5.

As is apparent from FIGS. 7, 24, 25 and 26 the drive means 25 comprises three positioning stops 116, 117 and 118 for the part of the drive means which forms a positioning element. The positioning stops 116, 117 and 118 are situated at the hollow cylindrical circumferential pot wall 59 of the bearing member 56. In a particularly simple manner a positioning stop 116, 117 and 118 is formed by each of the free ends of the first wall portions 60, 61 and 62 of the hollow cylindrical circumferential pot wall 59, which wall portions are rigidly connected to the pot-bottom wall 57 and which free ends are remote from the pot-bottom wall 57. By means of the positioning stops 116, 117 and 118 the reel disc 33 can be positioned vertically, i.e. in its axial direction, when the reel spindle 31 is in its non-driving position and the reel disc 33 is in its non-supporting position, in that the upper cap wall 66 of the reel disc 33 is supported on the positioning stops 116, 117 and 118 formed by the free ends of the first wall portions 60, 61 and 62. However, it is to be noted that the height of the second wall portions 63, 64 and 65, which are pivotally connected to the pot-bottom bottom wall 57, is slightly smaller than the height of the first wall portions 60, 61 and 62, which are rigidly connected to the pot-bottom wall 57.

As a result of the measures described in the foregoing the video recorder described above has the advantage that the video recorder comprises in total four drive means each having a reel spindle and a reel disc for selectively driving each time two reels of two magnetic-tape cassettes of different sizes, the drive means being stationarily mounted in the video recorder, which is advantageous for a stable and reliable arrangement, and that the drive means are arranged in the video recorder in accordance with the distances between the reels inside the magnetic-tape cassette, without any significant restrictions having to be taken into account. Moreover, with this video recorder it is achieved very simply that the reel spindles which are not suitable for driving the reels of a magnetic-tape cassette which has been loaded into the apparatus and the reel discs which are coaxial with these spindles can readily be moved out of the area of the magnetic-tape cassette which has been loaded into the apparatus and which is not adapted to enter into driving engagement with this reel spindle and this reel disc. Advantageously, the detection of a magnetic-tape cassette which is not adapted to enter into driving engagement with two reel spindles and the reel discs which are coaxial with these spindles is effected with the aid of these reel spindles, as a result of which no separate detection means for the detection of such a magnetic-tape cassette are required. Moreover, with the present video recorder it is achieved that the reel discs which are not adapted to enter into driving engagement with a magnetic-tape cassette which has been loaded into the apparatus are moved by means of this magnetic-tape cassette, which has the advantage that this video recorder neither requires any means for moving these reel discs. The video recorder described above further has the advantage of a very simple, compact and reliable construction of the drive means for the reels of two differently sized magnetic-tape cassettes although these drive means perform not only a driving function and a supporting function for the reels in these magnetic-tape cassettes but also a detection function, a displacement function and, partly, an additional positioning function.

A recording and reproducing apparatus in accordance with a second exemplary embodiment of the invention will be described below with reference to FIGS. 27 to 33.

In comparison with the drive means 25 described with reference to FIGS. 7, 24, 25 and 26 the drive means shown in FIGS. 27 to 33 has a different supporting construction for the bearing member 56. The drive means 25 shown in FIGS. 27 to 33 comprises a bearing disc 119 which is integral with a bearing sleeve 120 which is closed by a bottom 121. In a manner not shown the bearing sleeve 119 is secured to a deck plate of the apparatus. A bearing spindle 122 is press-fitted into the bearing sleeve 120 of the bearing disc 119 so as to be locked in rotation to the bearing disc 119. The free upper end portion 123 of the bearing spindle 122 is rounded.

In the drive means 25 shown in FIGS. 27 to 33 the substantially pot-shaped bearing member 56 has a bearing hub 58 which is closed by an upper wall 124 at its end which is remote from the pot-bottom wall 57. With this upper wall 124 the bearing member 56 cooperates with the rounded end portion 123 of the bearing spindle 122. Such a bearing construction is often referred to as a spherical-pivot bearing. Such a spherical-pivot bearing has the advantage that it exhibits a low friction.

Apart from this spherical-pivot bearing the drive means 25 shown in FIGS. 27 to 33 is of substantially the same construction as the drive means 25 shown in FIGS. 7, 24, 25 and 26. Such a spherical-pivot bearing in the apparatus comprising a drive means as shown in FIGS. 27 to 33 is also used in the other drive means of this apparatus, i.e. also in the drive means for driving the reels of a smaller magnetic-tape cassette. Obviously, such an apparatus also has the advantages of the invention as already set forth for the apparatus described with reference to FIGS. 1 to 26.

The invention is not limited to the exemplary embodiments described hereinbefore. For example, the reel discs and the reel spindles may be of another construction. A reel spindle may have, for example, only one coupling portion or more than three coupling portions. Moreover, the supporting stops for the reel discs need not be provided on a pot-shaped bearing member for the reel disc and the reel spindle. Alternatively, such supporting stops may be arranged, for example, on separate component parts. The means for moving the supporting stops may also be of another construction. For example, each part carrying a supporting stop may have a slot which forms part of a link motion and which is engaged by a pin which projects from the reel spindle and which also forms part of a link motion, the means for moving the supporting stops then being formed by this link motion.

We claim:

1. A recording and/or reproducing apparatus into which either a first magnetic-tape cassette having a first size and having at least one reel, or a second magnetic-tape cassette having a second size and having at least one reel, can be loaded in an operating position, said apparatus comprising:

a first reel spindle which is rotationally drivable relative to a first axis for driving the reel of the first magnetic-tape cassette;

a first reel disk which is coaxial with the first axis for supporting the reel of the first magnetic-tape cassette, the first reel spindle being movable in the direction of the first axis between a driving position, in which the first reel spindle is in driving engagement with the reel of the first magnetic-tape cassette, and a non-driving position, in which the first reel spindle is situated outside the area occupied by the second magnetic-tape cassette in the operating position thereof, and the first reel disc being movable in the direction of the first axis between a supporting position, in which the first reel disc supports the reel of the first magnetic-tape cassette, and a non-supporting position, in which the first reel disc is situated outside the area occupied by the second magnetic-tape cassette in the operating position thereof;

a second reel spindle which is rotationally drivable relative to a second axis for driving the reel of the second magnetic-tape cassettes;

and, a second reel disc which is coaxial with the second axis for supporting the reel of the second magnetic-tape cassette, characterized in that, in addition, the second reel spindle is movable in the direction of the second axis between a driving position, in which the second reel spindle is in driving engagement with the reel of the second magnetic-tape cassette, and a non-driving position, in which the second reel spindle is situated outside the area occupied by the first magnetic-tape cassette in the operating position thereof, and that, in addition, the second reel disc is movable in the direction of the second axis between a supporting position, in which the second reel disc supports the reel of the second magnetic-tape cassette, and a non-supporting position, in which the second reel disc is situated outside the area occupied by the first magnetic-tape cassette in the operating position thereof and, in that the first reel spindle and the first reel disc which is coaxial therewith form part of a first drive means for driving the reel of the first magnetic-tape cassette, in that the first drive means comprises a flat raised portion which forms a positioning element for the second magnetic-tape cassette, which raised portion, when the first reel spindle is in the non-driving position and the first reel disc is in the non-supporting position, vertically positions the second magnetic-tape cassette, and in that there is at least one positioning stop for the positioning element, by means of which positioning stop the first reel disc can be positioned in an axial direction when the first reel spindle is in the non-driving position and the first reel disc is in the non-supporting position.

2. An apparatus as claimed in claim 1, which further comprises:

at least one first supporting stop for the first reel disc, to support the reel of the first magnetic-tape cassette, which first supporting stop is movable between a blocking position and a release position, by means of which, the first supporting stop:

in the blocking position, blocks the first reel disc against an axial movement towards the non-supporting positions, and in the release position, allows the first reel disc to move into the non-supporting position;

and, at least one second supporting stop for the second reel disc to support the second reel disc, which second supporting stop is movable between a blocking position and a release position, by means of which, the second supporting stop:

the blocking position, blocks the second reel disc against an axial movement towards the non-supporting position, and in the release position, allows the second reel disc to move into the non-supporting position.

* * * * *